United States Patent
Raghavan et al.

(10) Patent No.: US 12,328,162 B2
(45) Date of Patent: Jun. 10, 2025

(54) RADIO FREQUENCY COMPONENT PREFERENCES IN HYBRID BEAMFORMING OPERATIONS AT MILLIMETER WAVE BANDS

(71) Applicant: QUALCOMM Incorporated, San Diego, CA (US)

(72) Inventors: Vasanthan Raghavan, West Windsor Township, NJ (US); Yu-Chin Ou, San Diego, CA (US); Mohammad Ali Tassoudji, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/178,151

(22) Filed: Mar. 3, 2023

(65) Prior Publication Data
US 2024/0297687 A1 Sep. 5, 2024

(51) Int. Cl.
*H04B 7/04* (2017.01)
*H04B 7/0426* (2017.01)
*H04W 8/22* (2009.01)
*H04W 28/02* (2009.01)
*H04W 48/16* (2009.01)

(52) U.S. Cl.
CPC .............. *H04B 7/043* (2013.01); *H04W 8/22* (2013.01); *H04W 28/0236* (2013.01); *H04W 48/16* (2013.01)

(58) Field of Classification Search
CPC .... H04B 7/043; H04W 8/22; H04W 28/0236; H04W 48/16
See application file for complete search history.

(56) References Cited

U.S. PATENT DOCUMENTS

| 11,799,704 | B2* | 10/2023 | Walk | H04L 27/2602 |
| 2019/0223033 | A1* | 7/2019 | Nam | H04B 7/0805 |
| 2020/0178134 | A1* | 6/2020 | Yang | H04W 36/00838 |
| 2021/0119346 | A1* | 4/2021 | Sur | H01Q 1/243 |
| 2021/0351507 | A1* | 11/2021 | Gorbachov | H01Q 21/24 |
| 2023/0370132 | A1* | 11/2023 | Raghavan | H04B 7/0695 |

OTHER PUBLICATIONS

International Search Report and Written Opinion—PCT/US2024/013966—ISA/EPO—May 13, 2024.
Shakib S., et al., "A Wideband 28-GHz Transmit-Receive Front-End for 5G Handset Phased Arrays in 40-nm CMOS", IEEE Transactions on Microwave Theory and Techniques, vol. 67, No. 7, Jul. 2019, pp. 2946-2963.

* cited by examiner

*Primary Examiner* — Freshteh N Aghdam
(74) *Attorney, Agent, or Firm* — Norton Rose Fulbright US LLP

(57) ABSTRACT

This disclosure provides systems, methods, and devices for wireless communication that support radio frequency (RF) component preferences in hybrid beamforming operations at millimeter Wave (mmWave) bands. In a first aspect, a method of wireless communication includes transmitting a capability message to a network entity including an identification of a constrained RF architecture of the UE, communicating an indication of a communication performance loss attributable to use of a non-preferred set of transmission states, and performing a communication with the network entity at the mmWave frequencies according to a transmission state selected by the network entity. Other aspects and features are also claimed and described.

30 Claims, 8 Drawing Sheets

RADIO FREQUENCY COMPONENT PREFERENCES IN HYBRID BEAMFORMING OPERATIONS AT MILLIMETER WAVE BANDS

TECHNICAL FIELD

Aspects of the present disclosure relate generally to wireless communication systems, and more particularly, to high frequency wireless communications. Some features may enable and provide improved communications, including radio frequency (RF) component preferences in hybrid beamforming operations at millimeter wave (mmWave) bands.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station or other network entity.

A network entity may transmit data and control information on a downlink to a UE or may receive data and control information on an uplink from the UE. On the downlink, a transmission from the network entity may encounter interference due to transmissions from neighbor network entities or from other wireless radio frequency (RF) transmitters. On the uplink, a transmission from the UE may encounter interference from uplink transmissions of other UEs communicating with the neighbor network entities or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication includes transmitting a capability message to a serving network entity, wherein the capability message includes an identification of a constrained radio frequency (RF) architecture of a beamforming network of the UE when operating at millimeter wave (mmWave) frequencies, wherein the constrained RF architecture of the UE is associated with a phase shifting behavior or a gain control behavior or a combination thereof, communicating an indication of a communication performance loss of the beamforming network attributable to use, by the UE, of a subset of non-preferred phase shifting states from a plurality of available phase shifting states or a subset of non-preferred gain control states from a plurality of available gain control states or a combination of the subset of non-preferred phase shifting states and the subset of non-preferred gain control states, and performing a communication with the serving network entity at the mmWave frequencies according to at least one phase shifting state of the plurality of available phase shifting states or at least one gain control state of the plurality of available gain control states or at least a combination of the at least one phase shifting state and the at least one gain control state.

In an additional aspect of the disclosure, a UE configured for wireless communication is disclosed. The UE includes at least one processor, and a memory coupled to the at least one processor. The at least one processor is configured to transmit a capability message to a serving network entity, wherein the capability message includes an identification of a constrained RF architecture of a beamforming network of the UE when operating at mmWave frequencies, wherein the constrained RF architecture of the UE is associated with a phase shifting behavior or a gain control behavior or a combination thereof, to communicate an indication of a communication performance loss of the beamforming network attributable to use, by the UE, of a subset of non-preferred phase shifting states from a plurality of available phase shifting states or a subset of non-preferred gain control states from a plurality of available gain control states or a combination of the subset of non-preferred phase shifting states and the subset of non-preferred gain control states, and to perform a communication with the serving network entity at the mm Wave frequencies according to at least one phase shifting state of the plurality of available phase shifting states or at least one gain control state of the plurality of available gain control states or at least a combination of the at least one phase shifting state and the at least one gain control state.

In an additional aspect of the disclosure, a UE configured for wireless communication is disclosed. The UE includes means for transmitting a capability message to a serving network entity, wherein the capability message includes an identification of a constrained RF architecture of a beamforming network of the UE when operating at mmWave frequencies, wherein the constrained RF architecture of the UE is associated with a phase shifting behavior or a gain control behavior or a combination thereof, means for communicating an indication of a communication performance loss of the beamforming network attributable to use, by the UE, of a subset of non-preferred phase shifting states from a plurality of available phase shifting states or a subset of non-preferred gain control states from a plurality of available gain control states or a combination of the subset of non-preferred phase shifting states and the subset of non-preferred gain control states, and means for performing a communication with the serving network entity at the mmWave frequencies according to at least one phase shifting state of the plurality of available phase shifting states or at least one gain control state of the plurality of available gain control states or at least a combination of the at least one phase shifting state and the at least one gain control state.

In an additional aspect of the disclosure, a non-transitory computer-readable medium stores instructions that, when executed by a processor, cause the processor to perform operations including transmitting a capability message to a serving network entity, wherein the capability message includes an identification of a constrained RF architecture of a beamforming network of the UE when operating at mmWave frequencies, wherein the constrained RF architecture of the UE is associated with a phase shifting behavior or a gain control behavior or a combination thereof, communicating an indication of a communication performance loss of the beamforming network attributable to use, by the UE, of a subset of non-preferred phase shifting states from a plurality of available phase shifting states or a subset of non-preferred gain control states from a plurality of available gain control states or a combination of the subset of non-preferred phase shifting states and the subset of non-preferred gain control states, and performing a communication with the serving network entity at the mmWave frequencies according to at least one phase shifting state of the plurality of available phase shifting states or at least one gain control state of the plurality of available gain control states or at least a combination of the at least one phase shifting state and the at least one gain control state.

Other aspects, features, and implementations will become apparent to those of ordinary skill in the art, upon reviewing the following description of specific, exemplary aspects in conjunction with the accompanying figures. While features may be discussed relative to certain aspects and figures below, various aspects may include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects may be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
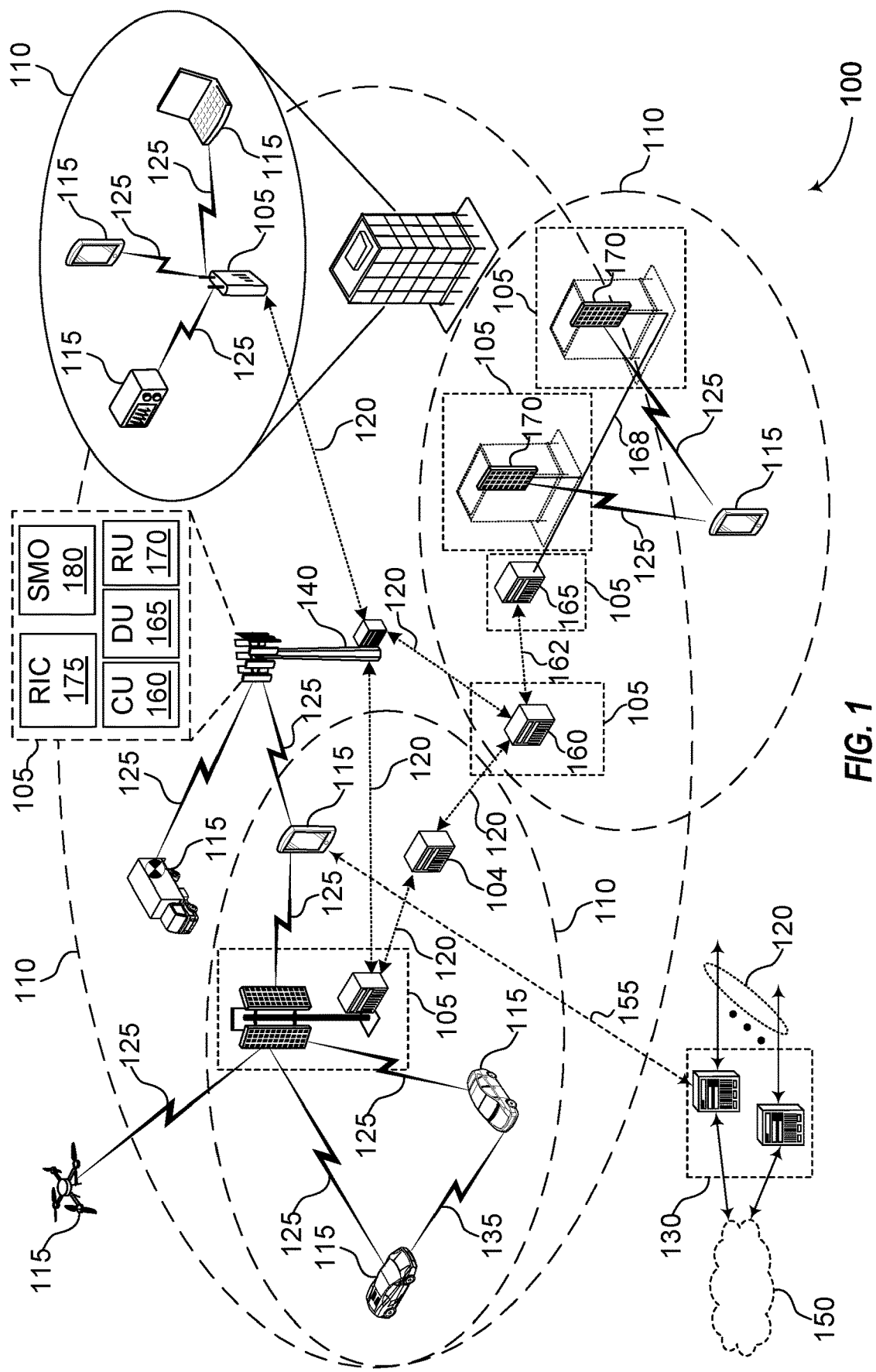
FIG. 1 illustrates an example of a wireless communications system that supports RF component preferences in hybrid beamforming operations at mmWave bands in accordance with one or more aspects of the present disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support radio frequency (RF) component preferences in hybrid beamforming operations at millimeter wave (mmWave) bands. Particular implementations of the subject matter described in this disclosure may be implemented to realize one or more of the following potential advantages or benefits. In some aspects, the present disclosure provides techniques for RF component preferences in hybrid beamforming operations at mmWave bands. Communication of a constrained RF architecture indication and potential communication performance loss associated with the constrained RF architecture of a UE's beamforming network components allows the UE operating at mmWave bands, especially the higher frequencies in the mmWave bands, to use preferred phase shifting states, gain control states, or combinations thereof, to avoid communication performance loss, whether explicitly selected in communications from a serving network entity or to achieve performance levels set by the serving network entities. Such a UE may also generate a hybrid beamforming codebook that accounts for the preferred and non-preferred transmission states, which allows the serving network entity to select the precoding matrix associated with higher performance characteristics.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~ 1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHZ-7.125 GHZ) and FR2 (24.25 GHZ-52.6 GHZ). The frequencies between FR1 and FR2 are often referred to as mid-band frequencies. Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHZ-300 GHZ) which is identified by the International Telecommunications Union (ITU) as a "mmW" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and, thus, may effectively extend features of FR1 and/or FR2 into mid-band frequencies. In addition, higher frequency bands are currently being explored to extend 5G NR operation beyond 52.6 GHZ. For example, three higher operating bands have been identified as frequency range designations FR2x (52.6 GHz-71 GHZ), FR4 (71 GHz-114.25 GHZ), and FR5 (114.25 GHZ-275 GHZ). Each of these higher frequency bands falls within the EHF band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "mmW" or the like if used herein may broadly represent frequencies that may include mid-band frequencies, may be within FR2, FR2x, FR4, and/or FR5, or may be within the EHF band.

5G NR devices, networks, and systems may be implemented to use optimized OFDM-based waveform features.

These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmW transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHZ FDD or TDD implementations, subcarrier spacing may occur with 15 kHz, for example over 1, 5, 10, 20 MHZ, and the like bandwidth. For other various outdoor and small cell coverage deployments of TDD greater than 3 GHZ, subcarrier spacing may occur with 30 kHz over 80/100 MHZ bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmW components at a TDD of 28 GHz, subcarrier spacing may occur with 120 kHz over a 500 MHz bandwidth.

The scalable numerology of 5G NR facilitates scalable TTI for diverse latency and quality of service (QOS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 illustrates an example of a wireless communications system 100 that supports RF component preferences in hybrid beamforming operations at mmWave bands in accordance with one or more aspects of the present disclosure. Wireless communications system 100 may include one or more network entities 105, one or more UEs 115, and a core network 130. In some examples, wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

Network entities 105 may be dispersed throughout a geographic area to form wireless communications system 100 and may include devices in different forms or having different capabilities. In 3GPP, the term "cell" may refer to this particular geographic coverage area of a network entity, such as network entities 105, or a network entity subsystem serving the coverage area, depending on the context in which the term is used. In various examples, network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, network entity 105 may support a coverage area 110 (e.g., a geographic coverage area) over which UEs 115 and network entity 105 may establish one or more communication links 125. Coverage area 110 may be an example of a geographic area over which network entity 105 and UE 115 may support the communication of signals according to one or more radio access technologies (RATs).

UEs 115 may be dispersed throughout coverage area 110 of the wireless communications system 100, and each UE 115 may be stationary, or mobile, or both at different times. UEs 115 may be devices in different forms or having different capabilities. Some example UEs 115 are illustrated in FIG. 1. UEs 115 described herein may be able to communicate with various types of devices, such as other UEs 115 or network entities 105, as shown in FIG. 1.

As described herein, a node of wireless communications system 100, which may be referred to as a network node, or a wireless node, may be network entity 105 (e.g., any network entity described herein), UE 115 (e.g., any UE described herein), a network controller, an apparatus, a device, a computing system, one or more components, or another suitable processing entity configured to perform any of the techniques described herein. For example, a node may be UE 115. As another example, a node may be network entity 105. As another example, a first node may be configured to communicate with a second node or a third node. In one aspect of this example, the first node may be UE 115, the second node may be network entity 105, and the third node may be UE 115. In another aspect of this example, the first node may be UE 115, the second node may be network entity 105, and the third node may be network entity 105. In yet other aspects of this example, the first, second, and third nodes may be different relative to these examples. Similarly, reference to UE 115, network entity 105, apparatus, device, computing system, or the like may include disclosure of UE 115, network entity 105, apparatus, device, computing system, or the like being a node. For example, disclosure that UE 115 is configured to receive information from network entity 105 also discloses that a first node is configured to receive information from a second node.

In some examples, network entities 105 may communicate with core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over backhaul communication link 120 (e.g., in accordance with an X2, Xn, or other interface protocol) either directly (e.g., directly between network entities 105) or indirectly (e.g., via core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. Backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. UE 115 may communicate with core network 130 through a communication link 155.

One or more of network entities 105 described herein may include or may be referred to as base station 140 (e.g., a base transceiver station, a radio base station, an NR base station, an access point, a radio transceiver, a transmission-reception point (TRP), a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, network entity 105 (e.g., base station 140) may be implemented in an aggregated (e.g., monolithic, standalone) base station architecture, which may be configured to utilize a protocol stack that is physically or logically integrated within a single network entity 105 (e.g., a single RAN node, such as base station 140).

In some examples, network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. RU 170 may also be referred to as a radio head, a smart radio head, a remote radio head (RRH), a remote radio unit (RRU), or a transmission reception point (TRP). One or more components of network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between CU 160, DU 165, and RU 175 is flexible and may support different functionalities depending upon which functions (e.g., network layer functions, protocol layer functions, baseband functions, RF functions, and any combinations thereof) are performed at CU 160, DU 165, or RU 175. For example, a functional split of a protocol stack may be employed between CU 160 and DU 165 such that CU 160 may support one or more layers of the protocol stack and DU 165 may support one or more different layers of the protocol stack. In some examples, CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). CU 160 may be connected to one or more DUs 165 or RUs 170, and one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by CU 160.

Additionally, or alternatively, a functional split of the protocol stack may be employed between DU 165 and RU 170 such that DU 165 may support one or more layers of the protocol stack and RU 170 may support one or more different layers of the protocol stack. DU 165 may support one or multiple different cells (e.g., via one or more RUs 170). In some cases, a functional split between CU 160 and DU 165, or between DU 165 and RU 170 may be within a protocol layer (e.g., some functions for a protocol layer may be performed by one of CU 160, DU 165, or RU 170, while other functions of the protocol layer are performed by a different one of CU 160, DU 165, or RU 170). CU 160 may be functionally split further into CU control plane (CU-CP) and CU user plane (CU-UP) functions. CU 160 may be connected to one or more DUs 165 via midhaul communication link 162 (e.g., F1, F1-c. F1-u), and DU 165 may be connected to one or more RUs 170 via fronthaul communication link 168 (e.g., open fronthaul (FH) interface). In some examples, midhaul communication link 162 or fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of RU 170) of IAB node 104 used for access via DU 165 of IAB node 104 (e.g., referred to as virtual IAB-MT (vIAB-MT)). In some examples, IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between core network 130 and the AN (e.g., via a wired or wireless connection to core network 130). That is, an IAB donor may refer to a RAN node with a wired or wireless connection to core network 130. The IAB donor may include CU 160 and at least one DU 165 (e.g., and RU 170), in which case CU 160 may communicate with core network 130 over an interface (e.g., a backhaul link). IAB donor and IAB nodes 104 may communicate over an F1 interface according to a protocol that defines signaling messages (e.g., an F1 AP protocol). Additionally, or alternatively, CU 160 may communicate with the core network over an interface, which may be an example of a portion of backhaul link, and may communicate with other CUs 160 (e.g., CU 160 associated with an alternative IAB donor) over an Xn-C interface, which may be an example of a portion of a backhaul link.

IAB node 104 may refer to a RAN node that provides IAB functionality (e.g., access for UEs 115, wireless self-backhauling capabilities). DU 165 may act as a distributed scheduling node towards child nodes associated with IAB node 104, and the IAB-MT may act as a scheduled node towards parent nodes associated with IAB node 104. That is, an IAB donor may be referred to as a parent node in communication with one or more child nodes (e.g., an IAB donor may relay transmissions for UEs through one or more other IAB nodes 104). Additionally, or alternatively, IAB node 104 may also be referred to as a parent node or a child node to other IAB nodes 104, depending on the relay chain or configuration of the AN. Therefore, the IAB-MT entity of IAB nodes 104 may provide a Uu-interface for a child IAB node 104 to receive signaling from parent IAB node 104, and the DU interface (e.g., DUs 165) may provide a Uu-interface for parent IAB node 104 to signal to child IAB node 104 or UE 115.

For example, IAB node 104 may be referred to as a parent node that supports communications for a child IAB node, and referred to as a child IAB node associated with an IAB donor. The IAB donor may include CU 160 with a wired or wireless connection (e.g., backhaul communication link 120) to core network 130 and may act as parent node to IAB nodes 104. For example, DU 165 of IAB donor may relay transmissions to UEs 115 through IAB nodes 104, and may directly signal transmissions to UE 115. CU 160 of IAB donor may signal communication link establishment via an F1 interface to IAB nodes 104, and IAB nodes 104 may schedule transmissions (e.g., transmissions to UEs 115 relayed from the IAB donor) through DUs 165. That is, data may be relayed to and from IAB nodes 104 via signaling over an NR Uu-interface to MT of IAB node 104. Communications with IAB node 104 may be scheduled by DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support scheduling requests for spatial multiplexing as described herein. For example, some operations described as being performed by UE 115 or network entity 105 (e.g., base station 140) may additionally, or alternatively, be performed by one or more components of the disaggregated RAN architecture (e.g., IAB nodes 104, DUs 165, CUs 160, RUs 170, RIC 175, SMO 180).

UE 115 may include or may be referred to as a mobile device, a wireless device, a remote device, a handheld device, or a subscriber device, or some other suitable terminology, where the "device" may also be referred to as a unit, a station, a terminal, or a client, among other examples. UE 115 may also include or may be referred to as a personal electronic device such as a cellular phone, a personal digital assistant (PDA), a tablet computer, a laptop computer, or a personal computer. In some examples, UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, a satellite radio, a global positioning system (GPS) device, a global navigation satellite system (GNSS) device, a logistics controller, an unmanned aerial vehicle (UAV), a drone, a smart energy or security device, a solar panel or solar array, etc. among other examples.

UEs 115 described herein may be able to communicate with various types of devices, such as other UEs 115 that may sometimes act as relays as well as network entities 105 and the network equipment including macro eNBs or gNBs, small cell eNBs or gNBs, or relay base stations, among other examples, as shown in FIG. 1.

UEs 115 and network entities 105 may wirelessly communicate with one another via one or more communication links 125 (e.g., an access link) over one or more carriers. The term "carrier" may refer to a set of RF spectrum resources having a defined physical layer structure for supporting communication links 125. For example, a carrier used for communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. Wireless communications system 100 may support communication with UE 115 using carrier aggregation or multi-carrier operation. UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between network entity 105 and other devices may refer to communication between the devices and any portion (e.g., entity, sub-entity) of network entity 105. For example, the terms "transmitting," "receiving," or "communicating," when referring to network entity 105, may refer to any portion of network entity 105 (e.g., base station 140, CU 160, DU 165, RU 170) of a RAN communicating with another device (e.g., directly or via one or more other network entities 105).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with UE 115.

One or more numerologies for a carrier may be supported, where a numerology may include a subcarrier spacing ($\Delta f$) and a cyclic prefix. A carrier may be divided into one or more BWPs having the same or different numerologies. In some examples, UE 115 may be configured with multiple BWPs. In some examples, a single BWP for a carrier may be active at a given time and communications for UE 115 may be restricted to one or more active BWPs.

The time intervals for network entities 105 or UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of UEs 115. For example, one or more of UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific one of UEs 115.

In some examples, network entity 105 (e.g., base station 140, RU 170) may be movable and therefore provide communication coverage for a moving one of coverage areas 110. In some examples, a different one of coverage areas 110 associated with different technologies may overlap, but the different one of coverage areas 110 may be supported by the same one of network entities 105. In some other examples, the overlapping coverage areas 110 associated with different technologies may be supported by different ones of network entities 105. Wireless communications system 100 may include, for example, a heterogeneous network in which different types of network entities 105 provide coverage for various coverage areas 110 using the same or different radio access technologies.

Some of UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or network entity 105 (e.g., base station 140) without human intervention. In some examples, M2M communication or MTC may include communications from devices that integrate sensors or meters to measure or capture information and relay such information to a central server or application program that makes use of the information or presents the information to humans interacting with the application program. Some of UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some of UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for UEs 115 include entering a power saving deep sleep mode when not engaging in active communications, operating over a limited bandwidth (e.g., according to narrowband communications), or a combination of these techniques. For example, some of UEs 115 may be configured for operation using a narrowband protocol type that is associated with a defined portion or range (e.g., set of subcarriers or resource blocks (RBs)) within a carrier, within a guard-band of a carrier, or outside of a carrier.

Wireless communications system 100 may be configured to support ultra-reliable communications or low-latency communications, or various combinations thereof. For example, wireless communications system 100 may be configured to support ultra-reliable low-latency communications (URLLC). UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within coverage area 110 of network entity 105 (e.g., base station 140, RU 170), which may support aspects of such D2D communications being configured by or scheduled by network entity 105. In some examples, one or more UEs 115 in such a group may be outside coverage area 110 of network entity 105 or may be otherwise unable to or not configured to receive transmissions from network entity 105. In some examples, groups of UEs 115 communicating via D2D communications may support a one-to-many (1:M) system in which each UE 115 transmits to each of the other ones of UEs 115 in the group. In some examples, network entity 105 may facilitate the scheduling of resources for D2D communications. In some other examples, D2D communications may be carried out between UEs 115 without the involvement of network entity 105.

In some systems, D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

Core network 130 may provide user authentication, access authorization, tracking, Internet Protocol (IP) connectivity, and other access, routing, or mobility functions. Core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for UEs 115 served by network entities 105 (e.g., base stations 140) associated with core network 130. User IP packets may be transferred through the user plane entity, which may provide IP address allocation as well as other functions. The user plane entity may be connected to IP services 150 for one or more network operators. IP services 150 may include access to the Internet, Intranet(s), an IP Multimedia Subsystem (IMS), or a Packet-Switched Streaming Service.

Wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHZ.

Wireless communications system 100 may also operate in a super high frequency (SHF) region using frequency bands from 3 GHz to 30 GHZ, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between UEs 115 and network entities 105 (e.g., base stations 140, RUs 170), and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

Wireless communications system 100 may utilize both licensed and unlicensed RF spectrum bands. For example, wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as network entities 105 and UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

Network entity 105 (e.g., base station 140, RU 170) or UE 115 may be equipped with multiple antennas, which may be used to employ techniques such as transmit diversity, receive diversity, multiple-input multiple-output (MIMO) communications, or beamforming. The antennas of network entity 105 or UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with network entity 105 may be located in diverse geographic locations. Network entity 105 may have an antenna array with a set of rows and columns of antenna ports that network entity 105 may use to support beamforming of communications with UE 115. Likewise, UE 115 may have one or more antenna arrays that may support various MIMO or beamforming operations. Additionally, or alternatively, an antenna panel may support RF beamforming for a signal transmitted via an antenna port.

Network entities 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., network entity 105, UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

Network entity 105 or UE 115 may use beam sweeping techniques as part of beamforming operations. For example, network entity 105 (e.g., base station 140, RU 170) may use multiple antennas or antenna arrays (e.g., antenna panels) to conduct beamforming operations for directional communications with UE 115. Some signals (e.g., synchronization signals, reference signals, beam selection signals, or other control signals) may be transmitted by network entity 105 multiple times along different directions. For example, network entity 105 may transmit a signal according to different beamforming weight sets associated with different directions of transmission. Transmissions along different beam directions may be used to identify (e.g., by a transmitting device, such as network entity 105, or by a receiving device, such as UE 115) a beam direction for later transmission or reception by network entity 105.

Some signals, such as data signals associated with a particular receiving device, may be transmitted by a transmitting device (e.g., transmitting network entity 105, transmitting UE 115) along a single beam direction (e.g., a direction associated with the receiving device, such as receiving network entity 105 or receiving UE 115). In some examples, the beam direction associated with transmissions along a single beam direction may be determined based on a signal that was transmitted along one or more beam directions. For example, UE 115 may receive one or more of the signals transmitted by network entity 105 along different directions and may report to network entity 105 an indication of the signal that UE 115 received with a highest signal quality or an otherwise acceptable signal quality.

In some examples, transmissions by a device (e.g., by network entity 105 or UE 115) may be performed using multiple beam directions, and the device may use a combination of digital precoding or beamforming to generate a combined beam for transmission (e.g., from network entity 105 to UE 115). The UE 115 may report feedback that indicates precoding weights for one or more beam directions, and the feedback may correspond to a configured set of beams across a system bandwidth or one or more subbands. Network entity 105 may transmit a reference signal (e.g., a cell-specific reference signal (CRS), a channel state information reference signal (CSI-RS)), which may be precoded or unprecoded. UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by network entity 105 (e.g., base station 140, RU 170), UE 115 may employ similar techniques for transmitting signals multiple times along different directions (e.g., for identifying a beam direction for subsequent transmission or reception by UE 115) or for transmitting a signal along a single direction (e.g., for transmitting data to a receiving device).

A receiving device (e.g., UE 115) may perform reception operations in accordance with multiple receive configurations (e.g., directional listening) when receiving various signals from a receiving device (e.g., network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

Wireless communications system 100 may be a packet-based network that operates according to a layered protocol stack. In the user plane, communications at the bearer or PDCP layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between UE 115 and network entity 105 or core network 130 supporting radio bearers for user plane data. At the PHY layer, transport channels may be mapped to physical channels.

UEs 115 and network entities 105 may support retransmissions of data to increase the likelihood that data is received successfully. Hybrid automatic repeat request (HARQ) feedback is one technique for increasing the likelihood that data is received correctly over a communication link (e.g., communication link 125, D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In some other examples, the device may provide HARQ feedback in a subsequent slot, or according to some other time interval.

Figure 2:
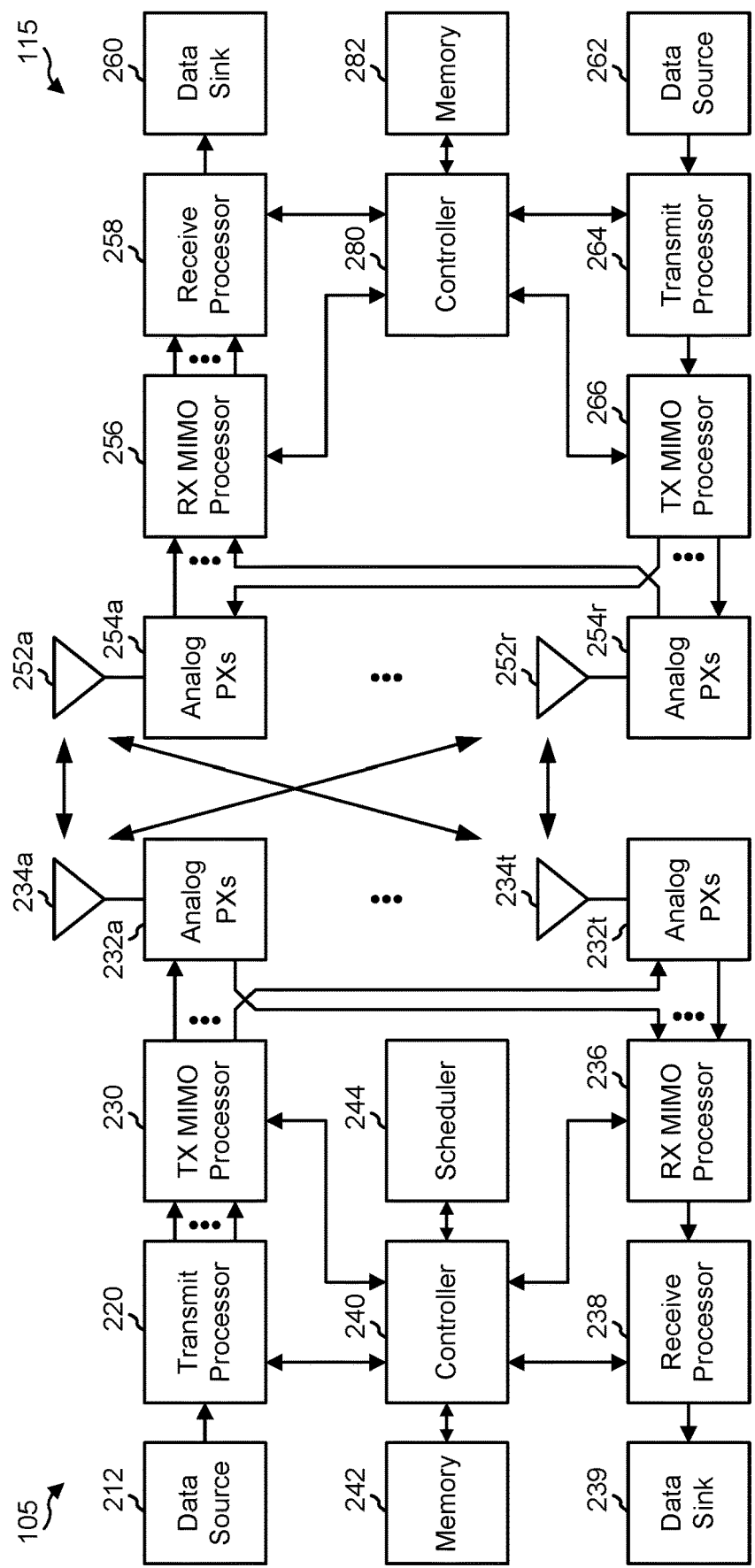
FIG. 2 is a block diagram illustrating examples of a base station and UE that may support RF component preferences in hybrid beamforming operations at mmWave bands according to one or more aspects.

FIG. 2 is a block diagram illustrating examples of base station 140 and UE 115 that may support RF component preferences in hybrid beamforming operations at mmWave bands according to one or more aspects. Base station 140 and UE 115 may be any of the network entities and base stations and one of the UEs in FIG. 1. For a restricted association scenario (as mentioned above), network entity 105 may be small cell base station, and UE 115 may be UE 115 operating in a service area of the small cell base station, which in order to access the small cell base station, would be included in a list of accessible UEs for the small cell base station. Base station 140 may also be a base station of some other type. As shown in FIG. 2, a network entity 105, such as base station 140 may be equipped with an antenna array (e.g., phase antenna array, etc.) including individual antenna elements, such as antenna elements 234a through 234t, and UE 115 may be equipped with an antenna array (e.g., phase antenna array, etc.) including individual antenna elements, such as antenna elements 252a through 252r for facilitating wireless communications.

For the downlink operation at base station 140, transmit processor 220 may receive data from data source 212 and control information from controller 240, such as one or more processors. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal.

Transmit (TX) MIMO processor 230 may perform spatial processing (e.g., precoding) in the digital/baseband domain on the data symbols, the control symbols, or the reference symbols, if applicable. Spatial processing performed by TX MIMO processor 230 on the data symbols, the control symbols, or the reference symbols may include precoding of the signal stream. TX MIMO processor 230 may further initiate analog transmission processing by demultiplexing the single, processed signal stream of the data, control, or reference symbols into multiple output symbol streams to analog processors (PXs) 232a through 232t. Analog PXs 232a through 232t may include multiple analog/radio frequency (RF) processing components, such as modulators, inverse fast Fourier transformers (IFFTs), digital-to-analog (DAC) components, upconverters/downconverters, variable gain control, power amplifiers (PAs), phase shifters, and the like. Each analog PXs 232a-t may process a respective output symbol stream (e.g., for OFDM, etc.) to obtain an output sample stream and may additionally or alternatively process (e.g., convert to analog, amplify, filter, and upconvert) the output sample stream to obtain a downlink signal. Each of the downlink signals output from PXs 232a through 232t may be transmitted via antenna elements 234a through 234t, respectively.

At UE 115, antenna elements 252a through 252r may receive the downlink signal energy from base station 140 and provide the received signal energy to analog PXs 254a through 254r, respectively. Similar to analog PXs 232a-232t of base station 140, each of analog PXs 254a-r may include multiple analog/radio frequency (RF) processing components, such as modulators, fast Fourier transformers (FFTs), analog-to-digital (ADC) components, upconverters/downconverters, variable gain control, PAs, phase shifters, and the like, and may condition (e.g., filter, amplify, downconvert, and digitize) the respective received signal energy to obtain input samples. Each of analog PXs 254a-r may further process the input samples (e.g., for OFDM, etc.) to obtain received symbol streams. Receive (RX) MIMO processor 256 may obtain the received symbol streams from analog PXs 254a through 254r, perform MIMO detection on the received symbol streams, if applicable, demultiplex the multiple received symbol streams to provide a single stream of detected symbols to receive processor 258. Receive processor 258 may process (e.g., demodulate, deinterleave, and decode) the detected symbols, provide decoded data for UE 115 to data sink 260, and provide decoded control information to controller 280, such as one or more processors.

For the uplink operations at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbol stream from transmit processor 264 may be precoded by TX MIMO processor 266 if applicable, in the digital/baseband domain. Similar to the downlink operations at base station 140, TX MIMO processor 266 may further initiate analog transmission processing by demultiplexing the single, processed symbol stream of the data, control, or reference symbols into multiple uplink symbol streams to analog PXs 254a through 254r. As noted above, analog PXs 254a through 254r may include multiple analog/RF processing components, such as modulators, IFFTs, DAC components, upconverters/downconverters, variable gain control, power amplifiers, phase shifters, and the like. Each analog PXs 254a-r may process a respective uplink symbol stream (e.g., for OFDM, SC-FDM, etc.) to obtain an output sample stream and may additionally or alternatively process (e.g., convert to analog, amplify, filter, and upconvert) the output sample stream to obtain an uplink signal stream. Each of the uplink signal streams output from PXs 254a through 254r may be transmitted via antenna elements 252a through 252r, respectively, and transmitted to network entity 105. At network entity 105, the uplink signal energy from UE 115 may be received by antenna elements 234a-t, processed by analog PXs 232a-t, processed by RX MIMO processor 236 from the multiple uplink signal streams into a single uplink signal stream, if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 140 and UE 115, respectively. Controller 240 or other processors and modules at base station 140 or controller 280 or other processors and modules at UE 115 may perform or direct the execution of various processes for the techniques described herein, such as to perform or direct the execution illustrated in FIG. 3, or other processes for the techniques described herein. Memories 242 and 282 may store data and program codes for base station 140 and UE 115, respectively. Scheduler 244 may schedule UEs for data transmission on the downlink or the uplink.

In some cases, UE 115 and base station 140 may operate in a shared radio frequency spectrum band, which may include licensed or unlicensed (e.g., contention-based) frequency spectrum. In an unlicensed frequency portion of the shared radio frequency spectrum band, UEs 115 or base station 140 may traditionally perform a medium-sensing procedure to contend for access to the frequency spectrum. For example, UE 115 or base station 140 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

In general, four categories of LBT procedure have been suggested for sensing a shared channel for signals that may indicate the channel is already occupied. In a first category (CAT 1 LBT), no LBT or CCA is applied to detect occupancy of the shared channel. A second category (CAT 2 LBT), which may also be referred to as an abbreviated LBT, a single-shot LBT, a 16-µs, or a 25-µs LBT, provides for the node to perform a CCA to detect energy above a predetermined threshold or detect a message or preamble occupying the shared channel. The CAT 2 LBT performs the CCA without using a random back-off operation, which results in its abbreviated length, relative to the next categories.

A third category (CAT 3 LBT) performs CCA to detect energy or messages on a shared channel, but also uses a random back-off and fixed contention window. Therefore, when the node initiates the CAT 3 LBT, it performs a first CCA to detect occupancy of the shared channel. If the shared channel is idle for the duration of the first CCA, the node may proceed to transmit. However, if the first CCA detects a signal occupying the shared channel, the node selects a random back-off based on the fixed contention window size and performs an extended CCA. If the shared channel is detected to be idle during the extended CCA and the random number has been decremented to 0, then the node may begin transmission on the shared channel. Otherwise, the node decrements the random number and performs another extended CCA. The node would continue performing extended CCA until the random number reaches 0. If the random number reaches 0 without any of the extended CCAs detecting channel occupancy, the node may then transmit on the shared channel. If at any of the extended CCA, the node detects channel occupancy, the node may re-select a new random back-off based on the fixed contention window size to begin the countdown again.

A fourth category (CAT 4 LBT), which may also be referred to as a full LBT procedure, performs the CCA with energy or message detection using a random back-off and variable contention window size. The sequence of CCA detection proceeds similarly to the process of the CAT 3 LBT, except that the contention window size is variable for the CAT 4 LBT procedure.

Sensing for shared channel access may also be categorized into either full-blown or abbreviated types of LBT procedures. For example, a full LBT procedure, such as a CAT 3 or CAT 4 LBT procedure, including extended channel clearance assessment (ECCA) over a non-trivial number of 9-µs slots, may also be referred to as a "Type 1 LBT." An abbreviated LBT procedure, such as a CAT 2 LBT procedure, which may include a one-shot CCA for 16-µs or 25-µs, may also be referred to as a "Type 2 LBT."

Use of a medium-sensing procedure to contend for access to an unlicensed shared spectrum may result in communication inefficiencies. This may be particularly evident when multiple network operating entities (e.g., network operators) are attempting to access a shared resource. In wireless communications system 100, network entities 105 and UEs 115 may be operated by the same or different network operating entities. In some examples, an individual network entity 105 or UE 115 may be operated by more than one network operating entity. In other examples, each network entity 105 and UE 115 may be operated by a single network operating entity. Requiring each network entity 105 and UE 115 of different network operating entities to contend for shared resources may result in increased signaling overhead and communication latency.

In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

Beamforming is an important tool for wireless communications that involves configuration of antenna arrays to transmit electromagnetic energy along a specific direction. Beamforming may be implemented using analog, digital, and hybrid processes. Analog beamforming operates by sending one signal to multiple antenna elements in a phased antenna array. The signals sent to each antenna element may be delayed by a specific time window, which applies a phase difference to the emission from each antenna element in the array. Digital beamforming operates with multiple modulated signals being sent to the antenna array, in which the phases and amplitudes of the signals sent to the array may be combined to produce the desired beam pattern. Digital beamforming may be considered a type of precoding, in which the beam pattern can be defined as a sum of products of a carrier wave and a spatial distribution function, where the relationship between the emitted signal from each antenna element and the input signal to each antenna element may be defined in a precoding matrix. Hybrid beamforming blends both digital and analog techniques to create multiple beams and, thus, reach multiple users with varying intensities. Hybrid beamforming may first precode the set of input data streams, as in digital beamforming, but, instead of outputting the stream directly to the entire antenna array, the precoded streams may be sent to individual analog beamformers, or sub-arrays, after which the stream sent to each sub-array may then be phase shifted to produce a beam from that sub-array, which is directed at a UE. Hybrid beamforming may be more commonly used or targeted for use in FR2 and higher frequency ranges in order to improve link budget through coherently combining energy across antenna elements.

The beamforming network, when considering hybrid beamforming processes, in a UE or network entity, may include both the analog/RF components, such as antenna elements, phase shifters, variable gain control, upconverters, downconverters, analog-to-digital converters (ADC) (for transmission), digital-to-analog converters (DAC) (for reception), multiplexers, demultiplexers, switches, and the like, and the digital/baseband domain components, such as the transmit and receive MIMO processing, and other signal processing aspects. As illustrated in FIG. 2, the beamforming network of UE 115, for hybrid beamforming, may include transmit processor 264, TX MIMO processor 266, receive processor 258, RX MIMO processor 256, analog PXs 254a-r, and antenna elements 252a-r. The beamforming network of base station 140, for hybrid beamforming, may include transmit processor 220, TX MIMO processor 230, receive processor 238, RX MIMO processor 236, analog PXs 232a-t, and antenna elements 234a-t.

Coherent combining may be realized by the use of phase shifting behavior and/or amplitude control behavior, such as the gain control states of power amplifiers (PAs). At 28 GHz, the amplitude and gain error deviations across available phase shifter states and/or gain control states has been seen to be minimal or negligible. Similarly, the phase error across PA gain control states has also been seen to be minimal or negligible. Because of the minimal or negligible error deviations at such frequencies, it could be assumed that the RF components used in a hybrid beamforming network have no preferences in terms of phase shifting or gain control behaviors, such that all phase shifting or gain control states are equally preferable. However, as FR2 advances into FR4/5, non-negligible errors can be seen for both such error quantities. Some of these observed non-negligible errors are associated with certain phase shifting or gain control states (collectively, which may be referred to herein as "transmission states"), while other phase shifting or gain control states, at the higher operating frequencies associate with the more negligible errors. Thus, the non-negligible errors provide an indication of non-preferred choices of transmission states, and the more negligible errors provide an indication of preferred choices of transmissions states.

Phase shifter and gain control states (in a PA) can lead to substantial variations as carrier frequency increases. These increases in non-negligible errors associated with some, but not all of the available transmission states, when operating at mmWave and higher carrier frequencies, identify what is referred to herein as "a constrained RF architecture" in the beamforming networks of the transmitting entities. The constraint occurs at the mm Wave or higher operating frequencies because some of the transmission states that exhibit the non-negligible errors at the mmWave frequencies exhibit negligible errors at lower frequencies, such as FR2. There may be many different causes for these variations. One potential cause may be the process used for fabricating the underlying microchips of the wireless communication chipsets. Microchips used in devices with operations at lower mmWave carrier frequencies may typically be designed using a complementary metal oxide semiconductor (CMOS) processes for which lower $f_{max}$ and $f_T$ are typical examples. These parameters, $f_{max}$ and $f_T$ are considered figures of merit (FoM), which are used to describe semiconductor processes. $f_{max}$ is the frequency at which the unilateral gain becomes unity, or 0 dB, which may be an important FoM at mmWave frequencies. $f_T$ is the transition frequency where the current gain goes to unity (0 dB). Sometimes chips at the higher mmWave/sub-THz carrier frequencies can be designed using semiconductor compounds within the III-V element group processes (Gallium-Arsenide (GaAs), Gallium-Nitride (GaN), etc.) and sometimes using CMOS/Silicon-Germanium (SiGe). These design differences can lead to significant variations and/or non-linearity in performance across different states and frequencies. Beyond chip design, accurate calibration procedures of RF components in a wireless communication device can also lead to lower sensitivity in performance with different phase shifting and/or gain control states.

Such an observation of non-negligible errors associated with certain transmission states could have a far-reaching impact on hybrid beamforming operations at these high frequencies. Various aspects of the present disclosure propose a UE to transmit to a serving network entity a capability message that includes identification of a constrained RF architecture of its beamforming network when the UE operates at mmWave frequencies. Aspects further provide for communication of an indication of preferred and/or non-preferred phase shifting and/or gain control states to the serving network entity, in which the indication of non-preferred transmission states also may include the performance loss value expected for use of such non-preferred transmission states.

Figure 3:
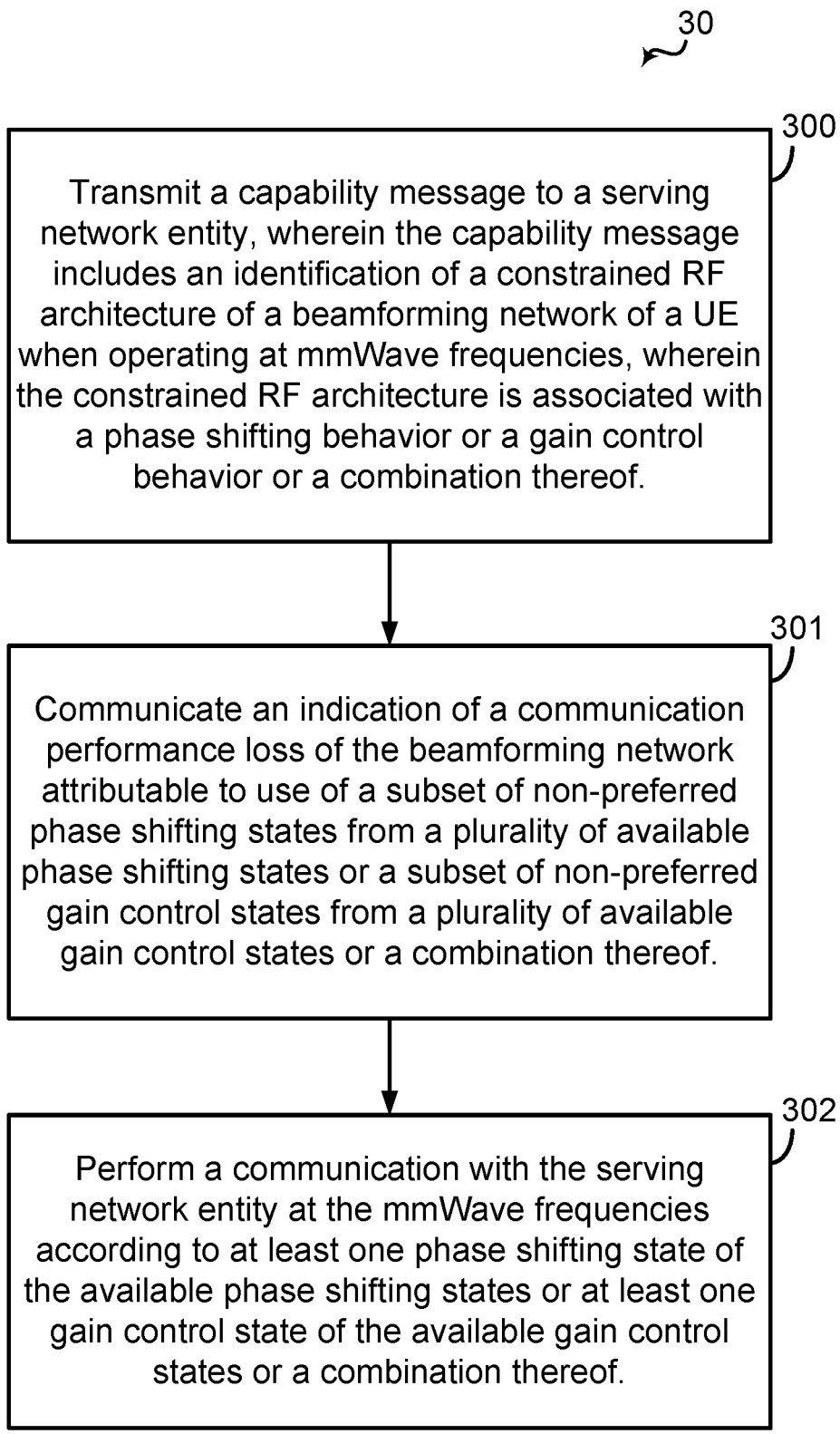
FIG. 3 is a flow diagram illustrating an example process that supports RF component preferences in hybrid beamforming operations at mmWave bands according to one or more aspects.

FIG. 3 is a flow diagram illustrating an example process 30 that supports RF component preferences in hybrid beamforming operations at mmWave bands according to one or more aspects. Operations of process 30 may be performed by a UE, such as UE 115 described above with reference to FIG. 1, 2, or a UE described with reference to FIG. 7. For example, example operations (also referred to as "blocks") of process 30 may enable UE 115 to support power headroom differential reporting for reference signals transmitted at different transmission power than other uplink transmissions.

At block 300, a UE transmits a capability message to a serving network entity, wherein the capability message includes an identification of a constrained RF architecture of a beamforming network of the UE when operating at mmWave frequencies, wherein the constrained RF architecture is associated with a phase shifting behavior or a gain control behavior or a combination thereof. The UE may gather capabilities information, including the existence of its constrained RF architecture, and transmit the capability message including such capability information and identification of the constrained RF architecture to the serving network entity. The UE may be pre-coded at manufacture with the information related to its constrained RF architecture and any performance loss values associated with particular non-preferred transmission states (e.g., phase shifting states, gain control states, or combinations thereof). In some aspects, the UE may transmit the capability message in a manner similar to that described elsewhere herein, e.g., the transmission of constrained RF message 401 of FIG. 4 and/or FIG. 5.

At block 301, the UE communicates an indication of a communication performance loss of the beamforming network attributable to use (by the UE) of a subset of non-preferred phase shifting states from a plurality of available phase shifting states or a subset of non-preferred gain control states from a plurality of available gain control states or a combination thereof. The UE may communicate the communication performance loss either along with the capability message or separately in an different transmission to the serving network entity. As noted above, the UE may be programmed at manufacture with information related to communication performance loss or may generate this communication performance loss indication as differential loss values between the communication performance of a particular transmission state and a predefined threshold performance value. In some aspects, the UE may communicate the indication in a manner similar to that described elsewhere herein, e.g., the communication of the indication 402 of FIG. 4, the indication 501 of FIG. 5, the indication 602 of FIG. 6A, and/or the indication 603 of FIG. 6B.

At block 302, the UE performs a communication with the serving network entity at the mmWave frequencies according to at least one phase shifting state of the plurality of available phase shifting states or at least one gain control state of the plurality of available gain control states or a combination thereof. The UE may receive indication of a selected transmission state(s) from a serving network entity. This selected transmission state(s) may be one of transmission states outside of the non-preferred transmission states communicated by the UE or it may be one of the non-preferred transmission states. The serving network entity is not bound to reject selecting any of the non-preferred transmission states that were communicated by any of its served UEs. In some aspects, the UE may perform the communication in a manner similar to that described elsewhere herein, e.g., the communication 408 of FIG. 4.

As described with reference to FIG. 3, the present disclosure provides techniques for RF component preferences in hybrid beamforming operations at mmWave bands. Communication of a constrained RF architecture indication and potential communication performance loss associated with the constrained RF architecture of a UE's beamforming network components allows the UE operating at mmWave bands, especially the higher frequencies in the mmWave bands, to use preferred phase shifting states, gain control states, or combinations thereof, to avoid communication performance loss, whether explicitly selected in communications from a serving network entity or to achieve performance levels set by the serving network entities. Such a UE may also generate a hybrid beamforming codebook that accounts for the preferred and non-preferred transmission states, which allows the serving network entity to select the precoding matrix associated with higher performance characteristics.

Figure 4:
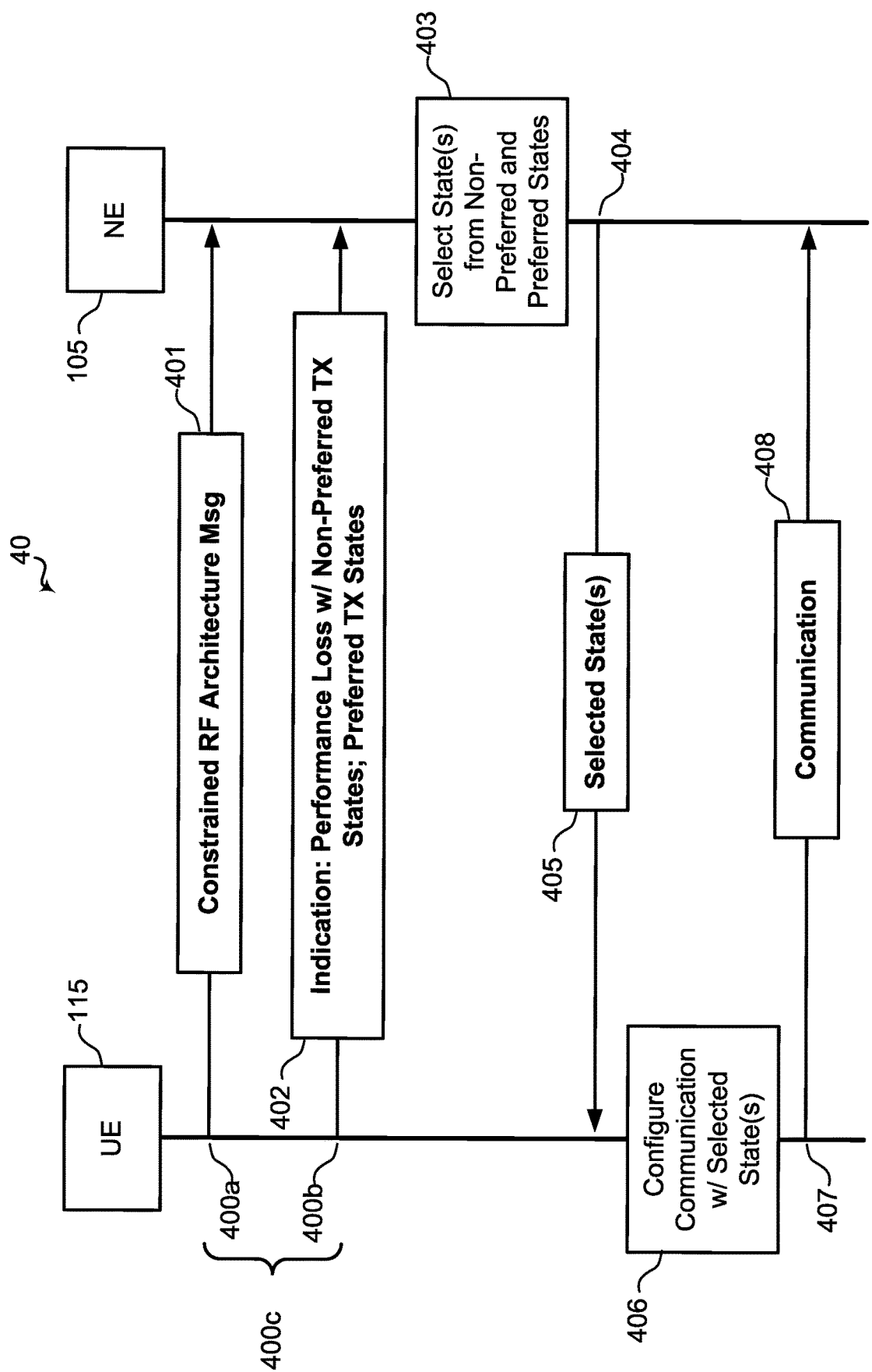
FIG. 4 is a call flow diagram illustrating communications occurring between a network entity and UE that that supports RF component preferences in hybrid beamforming operations at mmWave bands according to one or more aspects.

FIG. 4 is a call flow diagram illustrating communications 40 occurring between network entity 105 and UE 115 that that supports RF component preferences in hybrid beamforming operations at mmWave bands according to one or more aspects.

Communication 40 between UE 115 and network entity 105 occur at mmWave frequencies, with UE 115 using its beamforming network to generate directional beams for communicating with network entity 105. UE 115 has a constrained RF architecture. This condition may be known from manufacture of UE 115 and, thus, included in the memory of UE 115 at manufacture. Alternatively, UE 115 may measure performance characteristics to determine its constrained RF architecture, including any communication performance loss associated with specific transmission states (e.g., phase shifting states, gain control states, or combinations thereof) at such high frequencies, either through normal communications or through a pre-determined testing process.

At 400a, UE 115 transmits constrained RF architecture message 401 to network entity 105. At 400b, UE 115 transmits an indication 402 including communication performance loss values associated with specific non-preferred transmission states (e.g., phase shifting states, gain control states, or combinations thereof) and preferred transmission states, which do not experience similar, non-negligible communication performance losses. As noted above, UE 115 may have the information regarding communication performance loss, non-preferred transmission states and preferred transmission states in memory from the time of manufacture or it may compile such information through testing and measurement either during normal operations or in targeted testing operations. For example, UE 115 may determine or already have information of a differential loss value between the communication performance of UE 115 at the transmission state and a predetermined threshold performance value. UE 115 would transmit indication 402, in which the communication performance loss values include the differential loss values associated with each of the non-preferred transmission states.

It should be noted that constrained RF architecture message 401 and indication 402 transmitted at 400a and 400b, respectively, may be transmitted at different times, where 400a and 400b are different times. Alternatively 400a and 400b may be the same time, 400c (400a=400b=400c), in which constrained RF architecture message 401 and indication 402 are transmitted by UE 115a to network entity 105 in the same transmission at 400c.

It should further be noted that the non-preferred transmission states and the preferred transmission states may be determined based on the same or different communication performance characteristics. For example, the performance characteristics and resulting differential loss value associated with the non-preferred transmission states may be determined against a first threshold performance value, such that where the performance characteristics fall below the first threshold performance value, the associated transmission states are considered non-preferred transmission states and the corresponding differential loss values are transmitted to the serving network entity as an indication of the communication performance loss. Preferred transmission states may be the transmission states with performance characteristics above a second threshold performance value, where the second threshold performance value is the same as the first threshold performance value or a different, larger value.

Once network entity 105 receives indication 402, including communication performance loss values (e.g., differential loss values) associated with specific non-preferred transmission states (e.g., phase shifting states, gain control states, or combinations thereof) and preferred transmission states, it may determine, at 403, whether to select for UE 115 to perform communications using one of the non-preferred transmission states or one of the preferred transmission states. Network entity 105 may use the information on the communication performance loss to make this selection. Once selected, at 404, network entity 105 transmits the selected state(s) 405 to UE 115. UE 115, at 406, may then configure its phase shifting states, gain control states, or combinations thereof based on the selected state(s) 405 received from network element 105 and, at 407, transmit communication 408 to network element 105.

Figure 5:
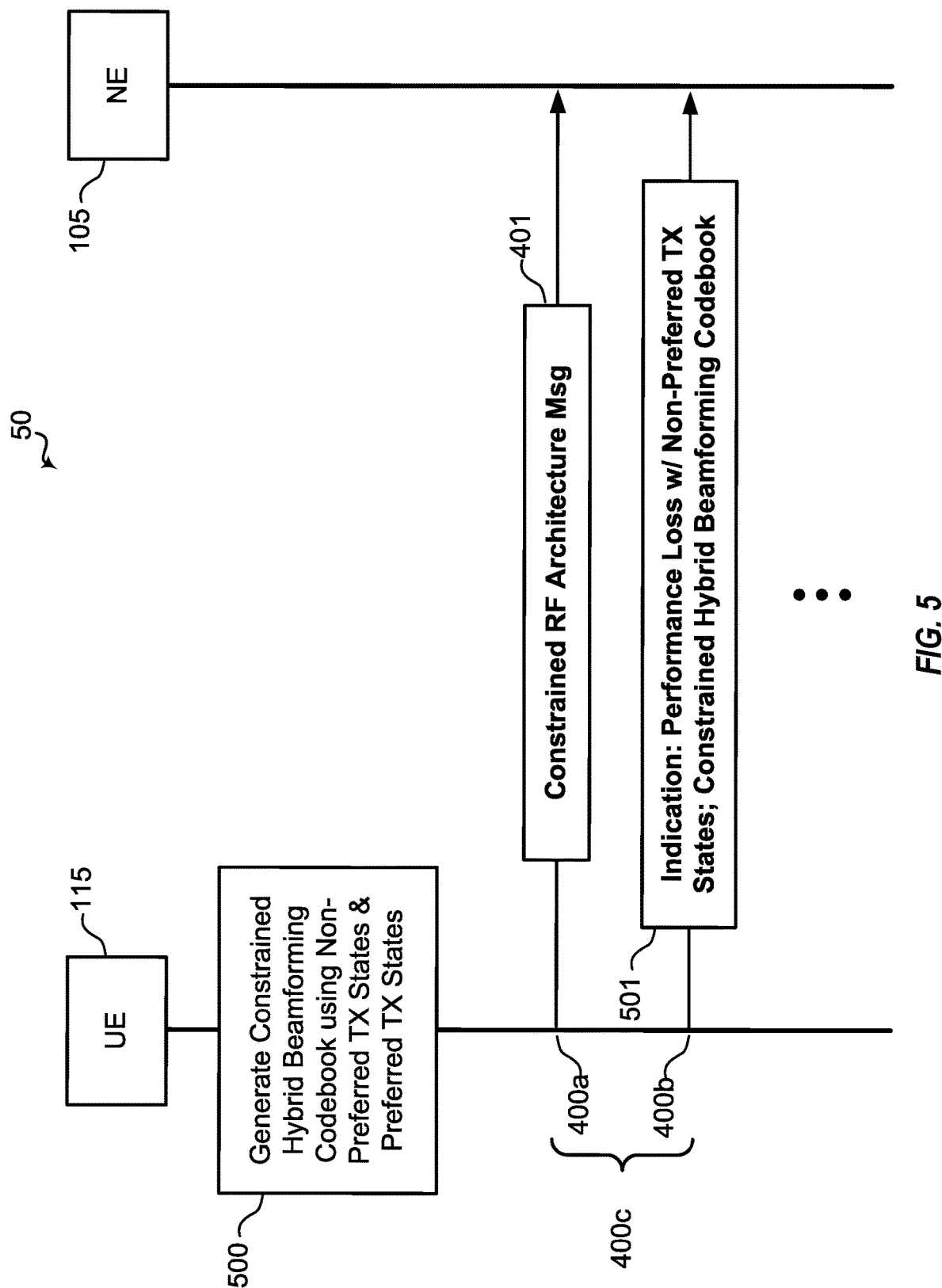
FIG. 5 is a call flow diagram illustrating communications occurring between a network entity 105 and UE 115 that that supports RF component preferences in hybrid beamforming operations at mmWave bands according to one or more aspects.

FIG. 5 is a call flow diagram illustrating communications 50 occurring between network entity 105 and UE 115 that that supports RF component preferences in hybrid beamforming operations at mmWave bands according to one or more aspects. The aspects of the present disclosure illustrated in FIG. 5 builds upon the communication of RF component preferences in communications 40. In the illustrated aspect of FIG. 5, UE 115 generates, at 500, a constrained hybrid beamforming codebook using the non-preferred and preferred transmission states (e.g., phase shifting states, gain control states, or combinations thereof). UE 115 can construct the constrained hybrid beamforming codebook using non-preferred and preferred transmission states to quantize an ideal codebook customized to the available RF component constraints of UE 115's beamforming network. Thus, the constrained hybrid beamforming codebook differs from the standardized hybrid beamforming codebook, defined in the applicable standards, by accounting for the constrained RF architecture and the communication performance loss associated with particular transmissions states caused by such constrained RF architecture.

Similar to communication 40 (FIG. 4), UE 115, at 400a, transmits constrained RF architecture message 401 to network entity 105, and, at 400b, transmits indication 501, which includes the communication performance loss values (e.g., the differential loss values noted above) associated with the non-preferred transmission states and the constrained hybrid beamforming codebook, that informs network entity 105 of the potential loss in performance with assumed codebook alphabet constraints within the constrained hybrid beamforming codebook. As noted with respect to FIGS. 4, 400a and 400b may be different times or the same time, 400c, such that UE 115 may transmit constrained RF architecture message 401 and indication 501 to network entity 105 at different times, 400a/400b, or the same time 400c. The remaining communications in communication 40 (FIG. 4) may then occur after the generation and transmission of the constrained hybrid beamforming codebook of communication 50.

The loss in communication performance observed at UE 115 can further reflect at least one or more of array gain (e.g., spherical coverage) or achievable transmission rate or spectral efficiency. UE 115 can use multiple constraints on the alphabets and the associated losses in communication performance. These different alphabet constraints within the constrained hybrid beamforming codebook can correspond to different "weights" on the preferred transmission states from the non-preferred transmission states. At 28 GHZ, an equal weighting across all transmission states can be used, while at higher mmWave and sub-THz frequencies, an unequal weighting is more realistic to account for the observable non-negligible deviations at the higher frequencies. From the conveyed non-preferred transmission states and the constrained hybrid beamforming codebook, which network entity 105 would use instead of the standardized hybrid beamforming codebook, network entity 105 can select and convey its preferred choice of transmission state(s) according to what loss in performance is acceptable from a link budget perspective at network entity 105.

Figure 6A:
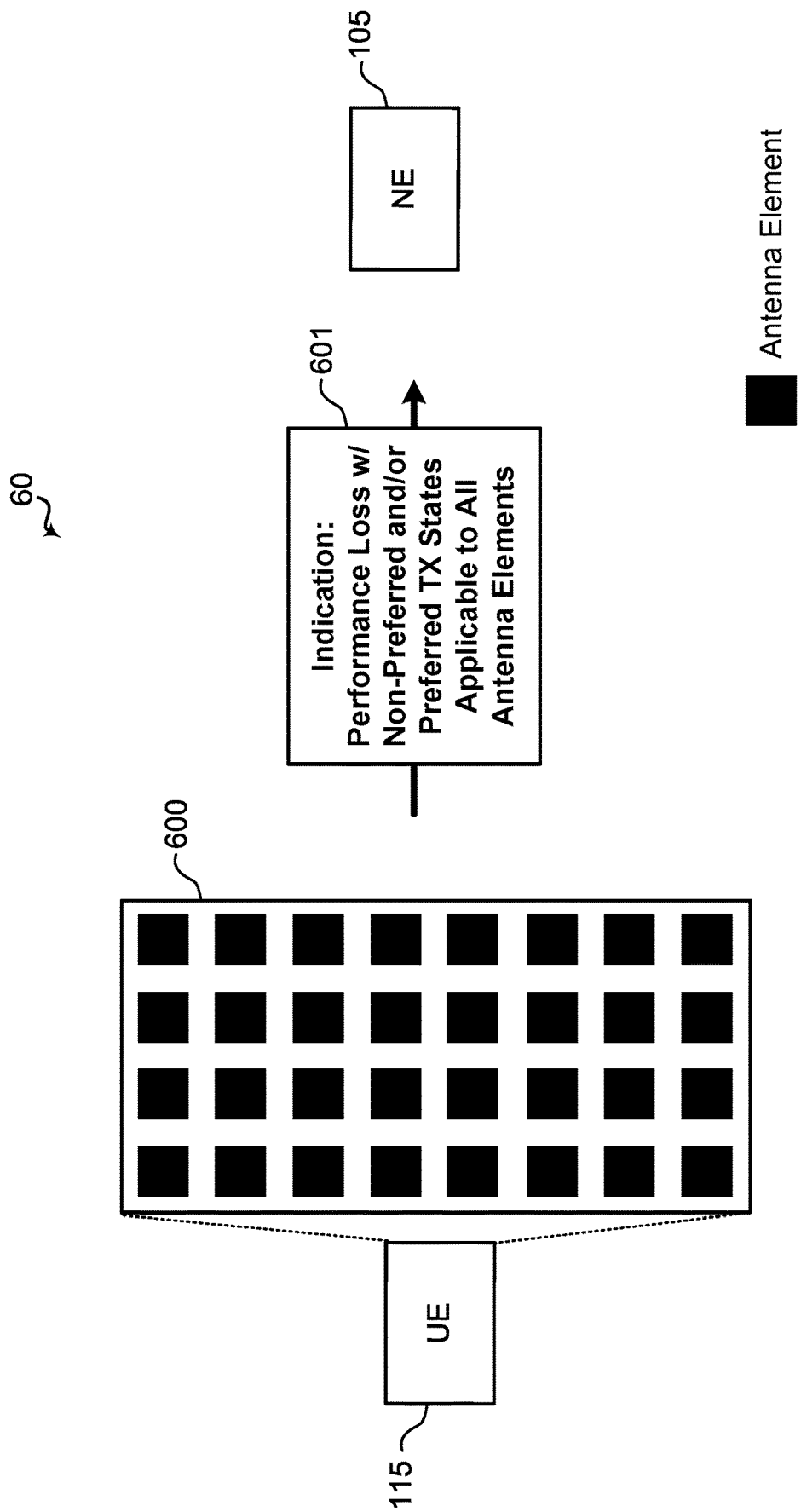
FIG. 6A is a block diagram illustrating a communication network including a network entity in communication with a UE, configured to support RF component preferences in hybrid beamforming operations at mmWave bands according to one or more aspects.

FIG. 6A is a block diagram illustrating communication network 60 including network entity 105 in communication with UE 115, configured to support RF component preferences in hybrid beamforming operations at mmWave bands according to one or more aspects. UE 115 includes a multi-element antenna array 600 configured with 8×4 antenna elements. UE 115 transmits indication 601 to network entity 105 at mmWave to sub-THz frequencies, including communication performance loss values associated with specific non-preferred transmission states (e.g., phase shifting states, gain control states, or combinations thereof) and preferred transmission states, which do not experience similar, non-negligible communication performance losses. According to the illustrated aspect, the preferred transmission states are universally acceptable or applicable to all 8×4 antenna elements of multi-element antenna array 600. Thus, any of the preferred transmission states may be applied at any antenna element or sub-array of antenna elements of multi-element antenna array 600.

Figure 6B:
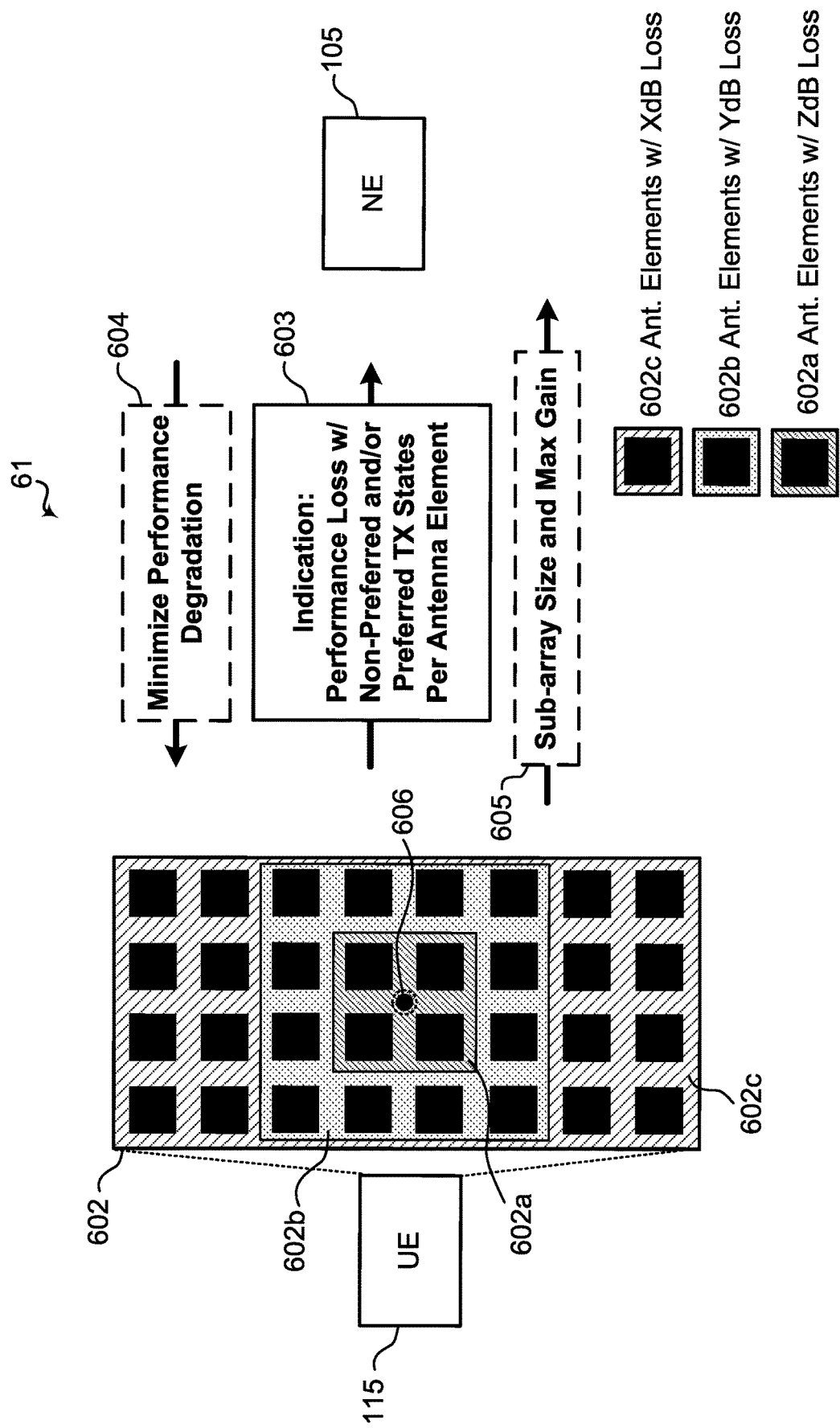
FIG. 6B is a block diagram illustrating a communication network including a network entity in communication with a UE, configured to support RF component preferences in hybrid beamforming operations at mmWave bands according to one or more aspects.

FIG. 6B is a block diagram illustrating communication network 61 including network entity 105 in communication with UE 115, configured to support RF component preferences in hybrid beamforming operations at mmWave bands according to one or more aspects. UE 115 includes a multi-element antenna array 602 configured with 8×4 antenna elements. In operation, phase shifts are realized via the use of transmission lines from the integrated circuit(s) (ICs) of the communication chipset to multi-element antenna array 602. Longer transmission lines generally lead to more significant losses as the carrier frequency increases (e.g., higher mm Wave/sub-THz frequencies). Thus, the antenna elements which are further from the power connector (e.g., power solder bump, bonding wire, etc.), power bump 606, in the IC (not shown) tend to see larger losses than the antenna elements closer to power bump 606 in the IC (not shown). In the illustrated example of multi-element antenna array 602, the closest antenna element to power bump 606 are located in area 602a (the "602a antenna elements") and experiences a transmission line-related loss of ZdB. The antenna elements of multi-element antenna array 602 located in area 602*b* (the "602*b* antenna elements") are further from power bump 606 than the 602*a* antenna elements and experience a transmission line-related loss of YdB, which is a greater degree of loss than ZdB. The antenna elements of multi-element antenna array 602 located in area 602*c* (the "602*c* antenna elements") are even further from power bump 606 than the 602*a* antenna elements and experienced the largest transmission line-related loss of XdB, such that ZdB<YdB<XdB.

To address transmission line-related loss associated with the antenna elements of antenna array 602, UE 115 transmits indication 603, which includes communication performance loss values associated with specific non-preferred transmission states (e.g., phase shifting states, gain control states, or combinations thereof) and preferred transmission states on a per-antenna element basis. For example, in the aspect illustrated in FIG. 6B, the 602*a* antenna elements use all possible preferred transmission states, whereas the 602*b* and 602*c* antenna elements would use those preferred transmission states that lead to fewer variations or communication performance losses in order to compensate for the increased transmission line loss experienced by the 602*b* and 602*c* antenna elements of multi-element antenna array 602 by virtue of their physical distance from power bump 606. Thus, the communication performance loss communicated by UE 115 may further include a differential loss value experienced at UE 115 through use of a reduced antenna array size in relation to a further predetermined threshold performance value.

In an alternative aspect illustrated in FIG. 6B, UE 115 can be prompted to limit the array size of multi-element antenna array 602 for communications in order to minimize performance degradation. For example, in such alternative aspect, network entity 105 may transmit alternative message 604 including an instruction for UE 115 to minimize performance degradation by a certain amount. UE 115 then estimates the performance degradation based on the transmission line-related losses related to the 602*a*, 602*b*, and 602*c* antenna elements. UE 115 can then identify the sub-array of multi-element antenna array 602 that would meet the performance degradation constraints indicated by alternative message 604. For example, UE 115 may determine the transmit communications using a sub-array of the 602*a* and 602*b* antenna elements, when the combination of the 602*a* and 602*b* antenna elements meet the performance degradation constraints. In other example scenarios, the performance degradation constraints may be met by just the 602*a* antenna elements.

In a further alternative aspect illustrated in FIG. 6B, UE 115 may determine autonomously to limit its array size in order to transmit communications at a maximum realizable array gain. Thus, UE 115 may determine to use a sub-array of the 602*a* antenna elements in order to achieve the maximum realizable array gain. UE 115 would then transmit an alternative message 605 to network entity 105 that identifies the sub-array and its maximum realizable array gain UE 115 will use for transmissions to maintain communication performance. In either such aspect, UE 115 and/or network entity 105 may select a transmission state or characteristic that results in maintaining a preferable communication performance at the mmWave to sub-THz frequencies.

Figure 7:
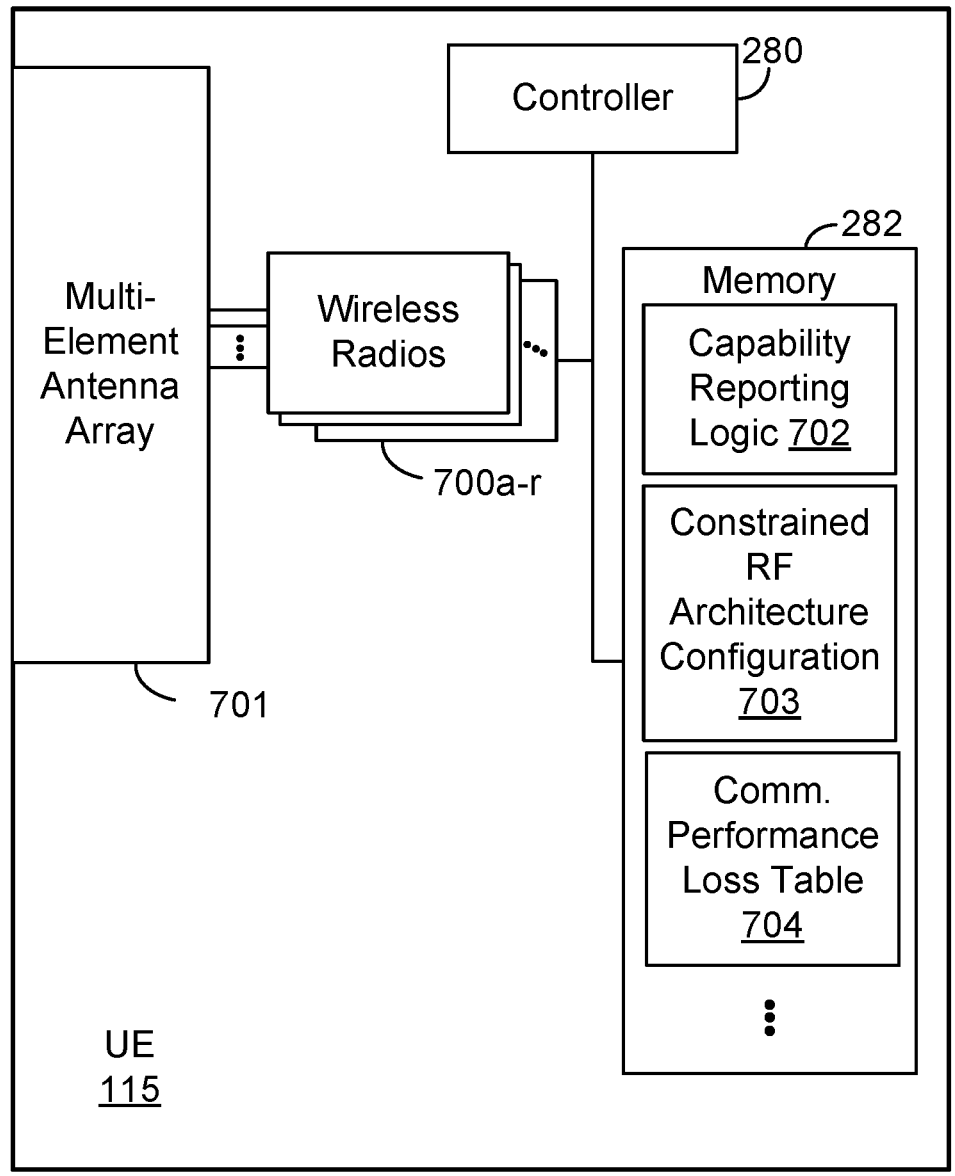
FIG. 7 is a block diagram of an example UE that supports RF component preferences in hybrid beamforming operations at mmWave bands according to one or more aspects.

FIG. 7 is a block diagram of an example UE 115 that supports RF component preferences in hybrid beamforming operations at mmWave bands according to one or more aspects. In some aspects, UE 115 may be configured to perform operations and communications in a manner similar to that described elsewhere herein, such as in FIGS. 3-6B. UE 115 may include the structure, hardware, and components shown and described with reference to UE 115 of FIGS. 1-2. For example, UE 115 includes controller 280, which operates to execute logic or computer instructions stored in memory 282, as well as controlling the components of UE 115 that provide the features and functionality of UE 115. UE 115, under control of controller 280, transmits and receives signals via wireless radios 700*a-r*, and multi-element antenna array 701, which may include multiple antenna elements, such as antenna elements 252*a-r* in FIG. 2. Wireless radios 700*a-r* may include various other components and hardware, as illustrated in FIG. 2 for UE 115, including analog PXs 254*a-r*, RX MIMO detector 256, receive processor 258, transmit processor 264, and TX MIMO processor 266.

As shown, memory 282 may include capability reporting logic 702, constrained RF architecture configuration 703, and communication performance loss table 704. Capability reporting logic 702 includes code and instructions, when executed by controller 280, (referred to herein as the "execution environment" of capability reporting logic 702) enables the features and functionality of UE 115 to report its capabilities to a serving network entity. Constrained RF architecture configuration 703 includes capability information related to the constrained nature of the RF architecture of UE 115. such information may be stored in memory 282 at manufacture or may be stored during normal use of UE 115 in which the constrained nature of the RF architecture is determined. Communication performance loss table 704 includes a table of communication performance loss values stored in a table indexed according to the transmission states (e.g., phase shifting states, gain control states, or a combination thereof). Again, such information may be stored in memory 282 at manufacture or may be stored during normal use of UE 115 during which such communication performance loss values associated with the particular transmission states are determined. UE 115 may receive signals from or transmit signals to one or more network entities, such as network entity 105 of FIGS. 1-2 and 4-6B.

UE 115, within the execution environment of capability reporting logic 702 may gather capabilities information, including the existence of a constrained RF architecture of its beamforming network, at constrained RF architecture configuration 703, in memory 282, and transmit a capability message including such capability information and identification of the constrained RF architecture via wireless radios 700*a-r* and multi-element antenna array. As noted above, the beamforming network of UE 115, for hybrid beamforming, may include transmit processor 264, TX MIMO processor 266, receive processor 258, RX MIMO processor 256, and analog PXs 254*a-r*, which may be included within wireless radios 700*a-r*, and antenna elements 252*a-r*, which may be included within multi-element antenna array 701. In some aspects, UE 115 may transmit the capability message in a manner similar to that described above with respect to the transmission of constrained RF message 401 of FIG. 4 and/or FIG. 5.

UE 115, either within the execution environment of capability reporting logic 702 along with the capability message or separately in an different transmission generated, under control of controller 280, and transmitted to a serving network entity via wireless radios 700*a-r* and multi-element antenna array 701, may communicate an indication of the communication performance loss values associated with particular transmission states as found at communication performance loss table 704, in memory 282. In some aspects, UE 115 may communicate the indication in a manner similar to that described above with respect to the communication of the indication 402 of FIG. 4, the indication 501 of FIG. 5, the indication 602 of FIG. 6A, and/or the indication 603 of FIG. 6B.

UE 115 may receive indication of a selected transmission state(s) from a serving network entity, via multi-element antenna arrays 701 and wireless radios 700a-r. This selected transmission state(s) may be one of transmission states outside of the non-preferred transmission states communicated by UE 115 or it may be one of the non-preferred transmission states. The serving network entity is not bound to reject selecting any of the non-preferred transmission states that were communicated by UE 115. In some aspects, UE 115 may perform the communication in a manner similar to that described above with respect to the communication 408 of FIG. 4.

It is noted that one or more blocks (or operations) described with reference to FIG. 3 may be combined with one or more blocks (or operations) described with reference to another of the figures. For example, one or more blocks (or operations) of FIG. 3 may be combined with one or more blocks (or operations) of FIG. 6A. As another example, one or more blocks associated with FIG. 4 may be combined with one or more blocks associated with FIG. 6B. As another example, one or more blocks associated with FIG. 3 may be combined with one or more blocks (or operations) associated with FIGS. 1-2. Additionally, or alternatively, one or more operations described above with reference to FIGS. 1-3 may be combined with one or more operations described with reference to FIG. 7.

In one or more aspects, techniques for supporting RF component preferences in hybrid beamforming operations at mmWave bands may include additional aspects, such as any single aspect or any combination of aspects described below or in connection with one or more other processes or devices described elsewhere herein. In a first aspect, supporting RF component preferences in hybrid beamforming operations at mmWave bands may include a UE configured for wireless communication comprising at least one processor and a memory coupled to the at least one processor. The at least one processor of the UE is configured to transmit a capability message to a serving network entity, wherein the capability message includes an identification of a constrained RF architecture of a beamforming network of the UE when operating at mmWave frequencies, wherein the constrained RF architecture of the UE is associated with a phase shifting behavior or a gain control behavior or a combination thereof, to communicate an indication of a communication performance loss of the beamforming network attributable to use, by the UE, of a subset of non-preferred phase shifting states from a plurality of available phase shifting states or a subset of non-preferred gain control states from a plurality of available gain control states or a combination of the subset of non-preferred phase shifting states and the subset of non-preferred gain control states, and to perform a communication with the serving network entity at the mmWave frequencies according to at least one phase shifting state of the plurality of available phase shifting states or at least one gain control state of the plurality of available gain control states or at least a combination of the at least one phase shifting state and the at least one gain control state.

Additionally, the apparatus may perform or operate according to one or more aspects as described below. In some implementations, the apparatus includes a wireless device, such as a UE. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a second aspect, alone or in combination with the first aspect, wherein the communication performance loss reflects, a differential loss value between a communication performance loss of each non-preferred phase shifting state of the subset of non-preferred phase shifting states and a first threshold performance value, wherein the communication performance of the each non-preferred phase shifting state falls the first threshold performance value, or the differential loss value between the communication performance of each non-preferred gain control state of the subset of non-preferred gain control states and the first threshold performance value, wherein the communication performance of the each non-preferred gain control state falls below the first threshold performance value, and wherein the indication further includes: a subset of preferred phase shifting states in which each preferred phase shifting state of the subset of preferred phase shifting states corresponds to the communication performance attributable to use of the each preferred phase shifting state, wherein the communication performance is higher than a second threshold performance value, or a subset of preferred gain control states in which each preferred gain control state of the subset of preferred gain control states corresponds to the communication performance attributable to use of the each preferred gain control state, wherein the communication performance is higher than the second threshold performance value, or a combination of the subset of preferred phase shifting states and the subset of preferred gain control states.

In a third aspect, alone or in combination with one or more of the first aspect or the second aspect, wherein the second threshold performance value is larger than the first threshold performance value.

In a fourth aspect, alone or in combination with one or more of the first aspect through the third aspect, wherein the subset of non-preferred phase shifting states, the subset of non-preferred gain control states, the combination of the subset of non-preferred phase shifting states and the subset of non-preferred gain control states, the subset of preferred phase shifting states, the subset of preferred gain control states, and the combination of the subset of preferred phase shifting states and the subset of preferred gain control states, are usable for each antenna element of a plurality of antenna elements of an antenna array of the UE.

In a fifth aspect, alone or in combination with one or more of the first aspect through the fourth aspect, wherein the subset of non-preferred phase shifting states, the subset of non-preferred gain control states, the combination of the subset of non-preferred phase shifting states and the subset of non-preferred gain control states, the subset of preferred phase shifting states, the subset of preferred gain control states, and the combination of the subset of preferred phase shifting states and the subset of preferred gain control states, are identified per antenna element of a plurality of antenna elements of an antenna array of the UE.

In a sixth aspect, alone or in combination with one or more of the first aspect through the fifth aspect, further including configuration of the at least one processor to identify a reduced antenna array size of a plurality of antenna elements of an antenna array of the UE, wherein the communication performance loss corresponds to the differential loss value between the communication performance of the reduced antenna array size and a third threshold performance value, wherein the configuration of the at least one processor to perform the communication with the serving network entity is using the reduced antenna array size.

In a seventh aspect, alone or in combination with one or more of the first aspect through the sixth aspect, wherein the configuration of the at least one processor to identify is in response to configuration of the at least one processor to one of: receive a performance message from the serving network entity; or determine a realizable array gain above a threshold minimum gain value, wherein the realizable array gain is associated with the reduced antenna array size and the reduced antenna array size is communicated by the UE to the serving network entity.

In an eighth aspect, alone or in combination with one or more of the first aspect through the seventh aspect, further including configuration of the at least one processor: to generate a constrained hybrid beamforming codebook including a plurality of precoding matrices, wherein each element of a precoding matrix of the plurality of precoding matrices is determined from within the subset of preferred phase shifting states, or the subset of preferred gain states, or the subset of non-preferred phase shifting states, or the subset of non-preferred gain states, wherein the configuration of the at least one processor to communicate the indication of the communication performance loss is associated with the use of the subset of non-preferred phase shifting states, or the subset of non-preferred gain control states, or the combination of the subset of non-preferred phase shifting states and the subset of non-preferred gain control states, or the subset of preferred phase shifting states, or the subset of preferred gain control states, or the combination of the subset of preferred phase shifting states and the subset of preferred gain control states, relative to an estimated communication performance with a standardized hybrid beamforming codebook without the constrained RF architecture.

A ninth aspect of wireless communication performed by a UE may include transmitting a capability message to a serving network entity including an identification of a constrained RF architecture of a beamforming network of the UE at mmWave frequencies, wherein the constrained RF architecture of the UE is associated with a phase shifting behavior or a gain control behavior or a combination thereof; communicating an indication of a communication performance loss of the beamforming network attributable to use, by the UE, of a subset of non-preferred phase shifting states from a plurality of available phase shifting states or a subset of non-preferred gain control states from a plurality of available gain control states or a combination of the subset of non-preferred phase shifting states and the subset of non-preferred gain control states; and performing a communication with the serving network entity at the mmWave frequencies according to at least one phase shifting state of the plurality of available phase shifting states or at least one gain control state of the plurality of available gain control states or at least a combination of the at least one phase shifting state and the at least one gain control state.

In a tenth aspect, alone or in combination with the ninth aspect, wherein the communication performance loss reflects, a differential loss value between a communication performance loss of each non-preferred phase shifting state of the subset of non-preferred phase shifting states and a first threshold performance value, wherein the communication performance of the each non-preferred phase shifting state falls the first threshold performance value, or the differential loss value between the communication performance of each non-preferred gain control state of the subset of non-preferred gain control states and the first threshold performance value, wherein the communication performance of the each non-preferred gain control state falls below the first threshold performance value, and wherein the indication further includes: a subset of preferred phase shifting states in which each preferred phase shifting state of the subset of preferred phase shifting states corresponds to the communication performance attributable to use of the each preferred phase shifting state, wherein the communication performance is higher than a second threshold performance value, or a subset of preferred gain control states in which each preferred gain control state of the subset of preferred gain control states corresponds to the communication performance attributable to use of the each preferred gain control state, wherein the communication performance is higher than the second threshold performance value, or a combination of the subset of preferred phase shifting states and the subset of preferred gain control states.

In an eleventh aspect, alone or in combination with one or more of the ninth aspect or the tenth aspect, wherein the second threshold performance value is larger than the first threshold performance value.

In a twelfth aspect, alone or in combination with one or more of the ninth aspect through the eleventh aspect, wherein the subset of non-preferred phase shifting states, the subset of non-preferred gain control states, the combination of the subset of non-preferred phase shifting states and the subset of non-preferred gain control states, the subset of preferred phase shifting states, the subset of preferred gain control states, and the combination of the subset of preferred phase shifting states and the subset of preferred gain control states, are usable for each antenna element of a plurality of antenna elements of an antenna array of the UE.

In a thirteenth aspect, alone or in combination with one or more of the ninth aspect through the twelfth aspect, wherein the subset of non-preferred phase shifting states, the subset of non-preferred gain control states, the combination of the subset of non-preferred phase shifting states and the subset of non-preferred gain control states, the subset of preferred phase shifting states, the subset of preferred gain control states, and the combination of the subset of preferred phase shifting states and the subset of preferred gain control states, are identified per antenna element of a plurality of antenna elements of an antenna array of the UE.

In a fourteenth aspect, alone or in combination with one or more of the ninth aspect through the thirteenth aspect, further including: identifying a reduced antenna array size of a plurality of antenna elements of an antenna array of the UE, wherein the communication performance loss corresponds to the differential loss value between the communication performance of the reduced antenna array size and a third threshold performance value, wherein the performing the communication with the serving network entity is using the reduced antenna array size.

In a fifteenth aspect, alone or in combination with one or more of the ninth aspect through the fourteenth aspect, wherein the identifying is in response to one of: receiving a performance message from the serving network entity; or determining a realizable array gain above a threshold minimum gain value, wherein the realizable array gain is associated with the reduced antenna array size and the reduced antenna array size is communicated by the UE to the serving network entity.

In a sixteenth aspect, alone or in combination with one or more of the ninth aspect through the fifteenth aspect, further including: generating a constrained hybrid beamforming codebook including a plurality of precoding matrices, wherein each element of a precoding matrix of the plurality of precoding matrices is determined from within the subset of preferred phase shifting states, or the subset of preferred gain states, or the subset of non-preferred phase shifting states, or the subset of non-preferred gain states, wherein the communicating the indication of the communication performance loss is associated with the use of the subset of non-preferred phase shifting states, or the subset of non-preferred gain control states, or the combination of the subset of non-preferred phase shifting states and the subset of non-preferred gain control states, or the subset of preferred phase shifting states, or the subset of preferred gain control states, or the combination of the subset of preferred phase shifting states and the subset of preferred gain control states, relative to an estimated communication performance with a standardized hybrid beamforming codebook without the constrained RF architecture.

A seventeenth aspect of a UE configured for wireless communication includes means for transmitting a capability message to a serving network entity including an identification of a constrained RF architecture of a beamforming network of the UE at mmWave frequencies, wherein the constrained RF architecture of the UE is associated with a phase shifting behavior or a gain control behavior or a combination thereof; means for communicating an indication of a communication performance loss of the beamforming network attributable to use, by the UE, of a subset of non-preferred phase shifting states from a plurality of available phase shifting states or a subset of non-preferred gain control states from a plurality of available gain control states or a combination of the subset of non-preferred phase shifting states and the subset of non-preferred gain control states; and means for performing a communication with the serving network entity at the mmWave frequencies according to at least one phase shifting state of the plurality of available phase shifting states or at least one gain control state of the plurality of available gain control states or at least a combination of the at least one phase shifting state and the at least one gain control state.

In an eighteenth aspect, alone or in combination with the seventeenth aspect, wherein the communication performance loss reflects, a differential loss value between a communication performance loss of each non-preferred phase shifting state of the subset of non-preferred phase shifting states and a first threshold performance value, wherein the communication performance of the each non-preferred phase shifting state falls the first threshold performance value, or the differential loss value between the communication performance of each non-preferred gain control state of the subset of non-preferred gain control states and the first threshold performance value, wherein the communication performance of the each non-preferred gain control state falls below the first threshold performance value, and wherein the indication further includes: a subset of preferred phase shifting states in which each preferred phase shifting state of the subset of preferred phase shifting states corresponds to the communication performance attributable to use of the each preferred phase shifting state, wherein the communication performance is higher than a second threshold performance value, or a subset of preferred gain control states in which each preferred gain control state of the subset of preferred gain control states corresponds to the communication performance attributable to use of the each preferred gain control state, wherein the communication performance is higher than the second threshold performance value, or a combination of the subset of preferred phase shifting states and the subset of preferred gain control states.

In a nineteenth aspect, alone or in combination with one or more of the seventeenth aspect or the eighteenth aspect, wherein the second threshold performance value is larger than the first threshold performance value.

In a twentieth aspect, alone or in combination with one or more of the seventeenth aspect through the nineteenth aspect, wherein the subset of non-preferred phase shifting states, the subset of non-preferred gain control states, the combination of the subset of non-preferred phase shifting states and the subset of non-preferred gain control states, the subset of preferred phase shifting states, the subset of preferred gain control states, and the combination of the subset of preferred phase shifting states and the subset of preferred gain control states, are usable for each antenna element of a plurality of antenna elements of an antenna array of the UE.

In a twenty-first aspect, alone or in combination with one or more of the seventeenth aspect through the twentieth aspect, wherein the subset of non-preferred phase shifting states, the subset of non-preferred gain control states, the combination of the subset of non-preferred phase shifting states and the subset of non-preferred gain control states, the subset of preferred phase shifting states, the subset of preferred gain control states, and the combination of the subset of preferred phase shifting states and the subset of preferred gain control states, are identified per antenna element of a plurality of antenna elements of an antenna array of the UE.

In a twenty-second aspect, alone or in combination with one or more of the seventeenth aspect through the twenty-first aspect, further including: means for identifying a reduced antenna array size of a plurality of antenna elements of an antenna array of the UE, wherein the communication performance loss corresponds to the differential loss value between the communication performance of the reduced antenna array size and a third threshold performance value, wherein the means for performing the communication with the serving network entity is using the reduced antenna array size.

In a twenty-third aspect, alone or in combination with one or more of the seventeenth aspect through the twenty-second aspect, wherein the means for identifying is executed in response to one of: means for receiving a performance message from the serving network entity; or means for determining a realizable array gain above a threshold minimum gain value, wherein the realizable array gain is associated with the reduced antenna array size and the reduced antenna array size is communicated by the UE to the serving network entity.

In a twenty-fourth aspect, alone or in combination with one or more of the seventeenth aspect through the twenty-third aspect, further including: means for generating a constrained hybrid beamforming codebook including a plurality of precoding matrices, wherein each element of a precoding matrix of the plurality of precoding matrices is determined from within the subset of preferred phase shifting states, or the subset of preferred gain states, or the subset of non-preferred phase shifting states, or the subset of non-preferred gain states, wherein the means for communicating the indication of the communication performance loss is associated with the use of the subset of non-preferred phase shifting states, or the subset of non-preferred gain control states, or the combination of the subset of non-preferred phase shifting states and the subset of non-preferred gain control states, or the subset of preferred phase shifting states, or the subset of preferred gain control states, or the combination of the subset of preferred phase shifting states and the subset of preferred gain control states, relative to an estimated communication performance with a standardized hybrid beamforming codebook without the constrained RF architecture.

A twenty-fifth aspect of a non-transitory computer-readable medium having program code recorded thereon. The program code includes program code executable by a computer for causing the computer to transmit a capability message to a serving network entity including an identification of a constrained RF architecture of a beamforming network of a UE associated with the non-transitory computer-readable medium at mm Wave frequencies, wherein the constrained RF architecture of the UE is associated with a phase shifting behavior or a gain control behavior or a combination thereof; program code executable by the computer for causing the computer to communicate an indication of a communication performance loss of the beamforming network attributable to use, by the UE, of a subset of non-preferred phase shifting states from a plurality of available phase shifting states or a subset of non-preferred gain control states from a plurality of available gain control states or a combination of the subset of non-preferred phase shifting states and the subset of non-preferred gain control states; and program code executable by the computer for causing the computer to perform a communication with the serving network entity at the mmWave frequencies according to at least one phase shifting state of the plurality of available phase shifting states or at least one gain control state of the plurality of available gain control states or at least a combination of the at least one phase shifting state and the at least one gain control state.

In a twenty-sixth aspect, alone or in combination with the twenty-fifth aspect, wherein the communication performance loss reflects, a differential loss value between a communication performance loss of each non-preferred phase shifting state of the subset of non-preferred phase shifting states and a first threshold performance value, wherein the communication performance of the each non-preferred phase shifting state falls the first threshold performance value, or the differential loss value between the communication performance of each non-preferred gain control state of the subset of non-preferred gain control states and the first threshold performance value, wherein the communication performance of the each non-preferred gain control state falls below the first threshold performance value, and wherein the indication further includes: a subset of preferred phase shifting states in which each preferred phase shifting state of the subset of preferred phase shifting states corresponds to the communication performance attributable to use of the each preferred phase shifting state, wherein the communication performance is higher than a second threshold performance value, or a subset of preferred gain control states in which each preferred gain control state of the subset of preferred gain control states corresponds to the communication performance attributable to use of the each preferred gain control state, wherein the communication performance is higher than the second threshold performance value, or a combination of the subset of preferred phase shifting states and the subset of preferred gain control states.

In a twenty-seventh aspect, alone or in combination with one or more of the twenty-fifth aspect or the twenty-sixth aspect, wherein the second threshold performance value is larger than the first threshold performance value.

In a twenty-eighth aspect, alone or in combination with one or more of the twenty-fifth aspect through the twenty-seventh aspect, wherein the subset of non-preferred phase shifting states, the subset of non-preferred gain control states, the combination of the subset of non-preferred phase shifting states and the subset of non-preferred gain control states, the subset of preferred phase shifting states, the subset of preferred gain control states, and the combination of the subset of preferred phase shifting states and the subset of preferred gain control states, are usable for each antenna element of a plurality of antenna elements of an antenna array of the UE.

In a twenty-ninth aspect, alone or in combination with one or more of the twenty-fifth aspect through the twenty-eighth aspect, wherein the subset of non-preferred phase shifting states, the subset of non-preferred gain control states, the combination of the subset of non-preferred phase shifting states and the subset of non-preferred gain control states, the subset of preferred phase shifting states, the subset of preferred gain control states, and the combination of the subset of preferred phase shifting states and the subset of preferred gain control states, are identified per antenna element of a plurality of antenna elements of an antenna array of the UE.

In a thirtieth aspect, alone or in combination with one or more of the twenty-fifth aspect through the twenty-ninth aspect, further including program code executable by the computer for causing the computer to identify a reduced antenna array size of a plurality of antenna elements of an antenna array of the UE, wherein the reduced antenna array size corresponds to the communication performance loss below a third threshold performance loss value, wherein the program code executable by the computer for causing the computer to perform the communication with the serving network entity is using the reduced antenna array size.

In a thirty-first aspect, alone or in combination with one or more of the twenty-fifth aspect through the thirtieth aspect, wherein the program code executable by the computer for causing the computer to identify is executed in response to execution of program code executable by the computer for causing the computer to one of: receive a performance message from the serving network entity; or determine a realizable array gain above a threshold minimum gain value, wherein the realizable array gain is associated with the reduced antenna array size and the reduced antenna array size is communicated by the UE to the serving network entity.

In a thirty-second aspect, alone or in combination with one or more of the twenty-fifth aspect through the thirty-first aspect, further including program code executable by the computer for causing the computer: to generate a constrained hybrid beamforming codebook including a plurality of precoding matrices wherein each element of a precoding matrix of the plurality of precoding matrices is determined from within the subset of preferred phase shifting states, or the subset of preferred gain states, or the subset of non-preferred phase shifting states, or the subset of non-preferred gain states, wherein the program code executable by the computer for causing the computer to communicate the indication of the communication performance loss is associated with the use of the subset of non-preferred phase shifting states, or the subset of non-preferred gain control states, or the combination of the subset of non-preferred phase shifting states and the subset of non-preferred gain control states, or the subset of preferred phase shifting states, or the subset of preferred gain control states, or the combination of the subset of preferred phase shifting states and the subset of preferred gain control states, relative to an estimated communication performance with a standard hybrid beamforming codebook without the constrained RF architecture.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-7 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A user equipment (UE) configured for wireless communication, the UE comprising:
   one or more power amplifiers (PAs);
   at least one processor; and
   a memory coupled to the at least one processor,
   wherein the at least one processor is configured:
      to transmit a capability message to a serving network entity, wherein the capability message includes an identification of a constrained radio frequency (RF) architecture of a beamforming network due to at least one PA of the one or more PAs of the UE when operating at millimeter wave (mmWave) frequencies, wherein the constrained RF architecture due to the at least one PA of the UE is associated with a phase shifting behavior or a gain control behavior or a combination thereof,
      to communicate an indication of a communication performance loss of the beamforming network attributable to use, by the UE, of a subset of non-preferred phase shifting states from a plurality of available phase shifting states or a subset of non-preferred gain control states from a plurality of available gain control states or a combination of the subset of non-preferred phase shifting states and the subset of non-preferred gain control states; and
      to perform a communication with the serving network entity at the mmWave frequencies according to at least one phase shifting state of the plurality of available phase shifting states or at least one gain control state of the plurality of available gain control states or at least a combination of the at least one phase shifting state and the at least one gain control state.

2. The UE of claim 1,
   wherein the communication performance loss reflects,
      a differential loss value between a communication performance of each non-preferred phase shifting state of the subset of non-preferred phase shifting states and a first threshold performance value, wherein the communication performance of the each non-preferred phase shifting state falls below the first threshold performance value, or
      the differential loss value between the communication performance of each non-preferred gain control state of the subset of non-preferred gain control states and the first threshold performance value, wherein the communication performance of the each non-preferred gain control state falls below the first threshold performance value, and
   wherein the indication further includes:
      a subset of preferred phase shifting states in which each preferred phase shifting state of the subset of preferred phase shifting states corresponds to the communication performance attributable to use of the each preferred phase shifting state, wherein the communication performance is higher than a second threshold performance value, or a subset of preferred gain control states in which each preferred gain control state of the subset of preferred gain control states corresponds to the communication performance attributable to use of the each preferred gain control state, wherein the communication performance is higher than the second threshold performance value, or a combination of the subset of preferred phase shifting states and the subset of preferred gain control states, wherein the communication performance is higher than the second threshold performance value, and wherein the first threshold performance value and the second threshold performance value are one of a same value or a different value.

3. The UE of claim 2, wherein the second threshold performance value is larger than the first threshold performance value.

4. The UE of claim 2, wherein
the subset of non-preferred phase shifting states,
the subset of non-preferred gain control states,
the combination of the subset of non-preferred phase shifting states and the subset of non-preferred gain control states,
the subset of preferred phase shifting states,
the subset of preferred gain control states, and
the combination of the subset of preferred phase shifting states and the subset of preferred gain control states,
are usable for each antenna element of a plurality of antenna elements of an antenna array of the UE.

5. The UE of claim 2, wherein
the subset of non-preferred phase shifting states,
the subset of non-preferred gain control states,
the combination of the subset of non-preferred phase shifting states and the subset of non-preferred gain control states,
the subset of preferred phase shifting states,
the subset of preferred gain control states, and
the combination of the subset of preferred phase shifting states and the subset of preferred gain control states,
are identified per antenna element of a plurality of antenna elements of an antenna array of the UE.

6. The UE of claim 2, further including configuration of the at least one processor to identify a reduced antenna array size of a plurality of antenna elements of an antenna array of the UE, wherein the communication performance loss corresponds to the differential loss value between the communication performance of the reduced antenna array size and a third threshold performance value, wherein the configuration of the at least one processor to perform the communication with the serving network entity is using the reduced antenna array size.

7. The UE of claim 6, wherein the configuration of the at least one processor to identify is in response to configuration of the at least one processor to one of:
receive a performance message from the serving network entity; or
determine a realizable array gain above a threshold minimum gain value, wherein the realizable array gain is associated with the reduced antenna array size and the reduced antenna array size is communicated by the UE to the serving network entity.

8. The UE of claim 2, further including configuration of the at least one processor:
to generate a constrained hybrid beamforming codebook including a plurality of precoding matrices, wherein each element of a precoding matrix of the plurality of precoding matrices is determined from within the subset of preferred phase shifting states, or the subset of preferred gain control states, or the subset of non-preferred phase shifting states, or the subset of non-preferred gain control states,
wherein the configuration of the at least one processor to communicate the indication of the communication performance loss is associated with the use of the subset of non-preferred phase shifting states, or the subset of non-preferred gain control states, or the combination of the subset of non-preferred phase shifting states and the subset of non-preferred gain control states, or the subset of preferred phase shifting states, or the subset of preferred gain control states, or the combination of the subset of preferred phase shifting states and the subset of preferred gain control states, relative to an estimated communication performance with a standardized hybrid beamforming codebook without the constrained RF architecture.

9. A method of wireless communication performed by a user equipment (UE), the method comprising:
transmitting a capability message to a serving network entity, wherein the capability message includes an identification of a constrained radio frequency (RF) architecture of a beamforming network due to one or more power amplifiers (PAs) of the UE when operating at millimeter wave (mmWave) frequencies, wherein the constrained RF architecture due to the one or more PA of the UE is associated with a phase shifting behavior or a gain control behavior or a combination thereof;
communicating an indication of a communication performance loss of the beamforming network attributable to use, by the UE, of a subset of non-preferred phase shifting states from a plurality of available phase shifting states or a subset of non-preferred gain control states from a plurality of available gain control states or a combination of the subset of non-preferred phase shifting states and the subset of non-preferred gain control states; and
performing a communication with the serving network entity at the mmWave frequencies according to at least one phase shifting state of the plurality of available phase shifting states or at least one gain control state of the plurality of available gain control states or at least a combination of the at least one phase shifting state and the at least one gain control state.

10. The method of claim 9,
wherein the communication performance loss reflects,
a differential loss value between a communication performance of each non-preferred phase shifting state of the subset of non-preferred phase shifting states and a first threshold performance value, wherein the communication performance of the each non-preferred phase shifting state falls below the first threshold performance value, or
the differential loss value between the communication performance of each non-preferred gain control state of the subset of non-preferred gain control states and the first threshold performance value, wherein the communication performance of the each non-preferred gain control state falls below the first threshold performance value, and
wherein the indication further includes:
a subset of preferred phase shifting states in which each preferred phase shifting state of the subset of preferred phase shifting states corresponds to the communication performance attributable to use of the each preferred phase shifting state, wherein the communication performance is higher than a second threshold performance value, or
  a subset of preferred gain control states in which each preferred gain control state of the subset of preferred gain control states corresponds to the communication performance attributable to use of the each preferred gain control state, wherein the communication performance is higher than the second threshold performance value, or
  a combination of the subset of preferred phase shifting states and the subset of preferred gain control states, wherein the communication performance is higher than the second threshold performance value, and wherein the first threshold performance value and the second threshold performance value are one of a same value or a different value.

11. The method of claim 10, wherein the second threshold performance value is larger than the first threshold performance value.

12. The method of claim 10, wherein
the subset of non-preferred phase shifting states,
the subset of non-preferred gain control states,
the combination of the subset of non-preferred phase shifting states and the subset of non-preferred gain control states,
the subset of preferred phase shifting states,
the subset of preferred gain control states, and
the combination of the subset of preferred phase shifting states and the subset of preferred gain control states,
are usable for each antenna element of a plurality of antenna elements of an antenna array of the UE.

13. The method of claim 10, wherein
the subset of non-preferred phase shifting states,
the subset of non-preferred gain control states,
the combination of the subset of non-preferred phase shifting states and the subset of non-preferred gain control states,
the subset of preferred phase shifting states,
the subset of preferred gain control states, and
the combination of the subset of preferred phase shifting states and the subset of preferred gain control states,
are identified per antenna element of a plurality of antenna elements of an antenna array of the UE.

14. The method of claim 10, further including:
identifying a reduced antenna array size of a plurality of antenna elements of an antenna array of the UE, wherein the communication performance loss corresponds to the differential loss value between the communication performance of the reduced antenna array size and a third threshold performance value, wherein the performing the communication with the serving network entity is using the reduced antenna array size.

15. The method of claim 14, wherein the identifying is in response to one of:
receiving a performance message from the serving network entity; or
determining a realizable array gain above a threshold minimum gain value, wherein the realizable array gain is associated with the reduced antenna array size and the reduced antenna array size is communicated by the UE to the serving network entity.

16. The method of claim 10, further including:
generating a constrained hybrid beamforming codebook including a plurality of precoding matrices, wherein each element of a precoding matrix of the plurality of precoding matrices is determined from within the subset of preferred phase shifting states, or the subset of preferred gain control states, or the subset of non-preferred phase shifting states, or the subset of non-preferred gain control states,
wherein the communicating the indication of the communication performance loss is associated with the use of the subset of non-preferred phase shifting states, or the subset of non-preferred gain control states, or the combination of the subset of non-preferred phase shifting states and the subset of non-preferred gain control states, or the subset of preferred phase shifting states, or the subset of preferred gain control states, or the combination of the subset of preferred phase shifting states and the subset of preferred gain control states, relative to an estimated communication performance with a standardized hybrid beamforming codebook without the constrained RF architecture.

17. A user equipment (UE) configured for wireless communication, comprising:
means for transmitting a capability message to a serving network entity, wherein the capability message includes an identification of a constrained radio frequency (RF) architecture of a beamforming network due to one or more power amplifiers (PAs) of the UE when operating at millimeter wave (mmWave) frequencies, wherein the constrained RF architecture due to the one or more PA of the UE is associated with a phase shifting behavior or a gain control behavior or a combination thereof;
means for communicating an indication of a communication performance loss of the beamforming network attributable to use, by the UE, of a subset of non-preferred phase shifting states from a plurality of available phase shifting states or a subset of non-preferred gain control states from a plurality of available gain control states or a combination of the subset of non-preferred phase shifting states and the subset of non-preferred gain control states; and
means for performing a communication with the serving network entity at the mmWave frequencies according to at least one phase shifting state of the plurality of available phase shifting states or at least one gain control state of the plurality of available gain control states or at least a combination of the at least one phase shifting state and the at least one gain control state.

18. The UE of claim 17,
wherein the communication performance loss reflects,
  a differential loss value between a communication performance of each non-preferred phase shifting state of the subset of non-preferred phase shifting states and a first threshold performance value, wherein the communication performance of the each non-preferred phase shifting state falls below the first threshold performance value, or
  the differential loss value between the communication performance of each non-preferred gain control state of the subset of non-preferred gain control states and the first threshold performance value, wherein the communication performance of the each non-preferred gain control state falls below the first threshold performance value, and
wherein the indication further includes:
  a subset of preferred phase shifting states in which each preferred phase shifting state of the subset of preferred phase shifting states corresponds to the communication performance attributable to use of the each preferred phase shifting state, wherein the communication performance is higher than a second threshold performance value, or
a subset of preferred gain control states in which each preferred gain control state of the subset of preferred gain control states corresponds to the communication performance attributable to use of the each preferred gain control state, wherein the communication performance is higher than the second threshold performance value, or
a combination of the subset of preferred phase shifting states and the subset of preferred gain control states, wherein the communication performance is higher than the second threshold performance value, and wherein the first threshold performance value and the second threshold performance value are one of a same value or a different value.

19. The UE of claim 18, wherein
the subset of non-preferred phase shifting states,
the subset of non-preferred gain control states,
the combination of the subset of non-preferred phase shifting states and the subset of non-preferred gain control states,
the subset of preferred phase shifting states,
the subset of preferred gain control states, and
the combination of the subset of preferred phase shifting states and the subset of preferred gain control states,
are usable for each antenna element of a plurality of antenna elements of an antenna array of the UE.

20. The UE of claim 19, wherein
the subset of non-preferred phase shifting states,
the subset of non-preferred gain control states,
the combination of the subset of non-preferred phase shifting states and the subset of non-preferred gain control states,
the subset of preferred phase shifting states,
the subset of preferred gain control states, and
the combination of the subset of preferred phase shifting states and the subset of preferred gain control states,
are identified per antenna element of the plurality of antenna elements of the antenna array of the UE.

21. The UE of claim 18, further including:
means for identifying a reduced antenna array size of a plurality of antenna elements of an antenna array of the UE, wherein the communication performance loss corresponds to the differential loss value between the communication performance of the reduced antenna array size and a third threshold performance value, wherein the means for performing the communication with the serving network entity is using the reduced antenna array size.

22. The UE of claim 21, wherein the means for identifying is executed in response to one of:
means for receiving a performance message from the serving network entity; or
means for determining a realizable array gain above a threshold minimum gain value, wherein the realizable array gain is associated with the reduced antenna array size and the reduced antenna array size is communicated by the UE to the serving network entity.

23. The UE of claim 18, further including:
means for generating a constrained hybrid beamforming codebook including a plurality of precoding matrices, wherein each element of a precoding matrix of the plurality of precoding matrices is determined from within the subset of preferred phase shifting states, or the subset of preferred gain control states, or the subset of non-preferred phase shifting states, or the subset of non-preferred gain control states,
wherein the means for communicating the indication of the communication performance loss is associated with the use of the subset of non-preferred phase shifting states, or the subset of non-preferred gain control states, or the combination of the subset of non-preferred phase shifting states and the subset of non-preferred gain control states, or the subset of preferred phase shifting states, or the subset of preferred gain control states, or the combination of the subset of preferred phase shifting states and the subset of preferred gain control states, relative to an estimated communication performance with a standardized hybrid beamforming codebook without the constrained RF architecture.

24. A non-transitory computer-readable medium having program code recorded thereon, the program code comprising:
program code executable by a computer for causing the computer to transmit a capability message to a serving network entity, wherein the capability message includes an identification of a constrained radio frequency (RF) architecture of a beamforming network due to one or more power amplifiers (PAs) of a user equipment (UE) associated with the non-transitory computer-readable medium, when the UE is operating at millimeter wave (mmWave) frequencies, wherein the constrained RF architecture due to the one or more PAs of the UE is associated with a phase shifting behavior or a gain control behavior or a combination thereof;
program code executable by the computer for causing the computer to communicate an indication of a communication performance loss of the beamforming network attributable to use, by the UE, of a subset of non-preferred phase shifting states from a plurality of available phase shifting states or a subset of non-preferred gain control states from a plurality of available gain control states or a combination of the subset of non-preferred phase shifting states and the subset of non-preferred gain control states; and
program code executable by the computer for causing the computer to perform a communication with the serving network entity at the mmWave frequencies according to at least one phase shifting state of the plurality of available phase shifting states or at least one gain control state of the plurality of available gain control states or at least a combination of the at least one phase shifting state and the at least one gain control state.

25. The non-transitory computer-readable medium of claim 24,
wherein the communication performance loss reflects,
a differential loss value between a communication performance of each non-preferred phase shifting state of the subset of non-preferred phase shifting states and a first threshold performance value, wherein the communication performance of the each non-preferred phase shifting state falls below the first threshold performance value, or
the differential loss value between the communication performance of each non-preferred gain control state of the subset of non-preferred gain control states and the first threshold performance value, wherein the communication performance of the each non-preferred gain control state falls below the first threshold performance value, and wherein the indication further includes:
- a subset of preferred phase shifting states in which each preferred phase shifting state of the subset of preferred phase shifting states corresponds to the communication performance attributable to use of the each preferred phase shifting state, wherein the communication performance is higher than a second threshold performance value, or
- a subset of preferred gain control states in which each preferred gain control state of the subset of preferred gain control states corresponds to the communication performance attributable to use of the each preferred gain control state, wherein the communication performance is higher than the second threshold performance value, or
- a combination of the subset of preferred phase shifting states and the subset of preferred gain control states, wherein the communication performance is higher than the second threshold performance value, and wherein the first threshold performance value and the second threshold performance value are one of a same value or a different value.

26. The non-transitory computer-readable medium of claim 25, wherein
the subset of non-preferred phase shifting states,
the subset of non-preferred gain control states,
the combination of the subset of non-preferred phase shifting states and the subset of non-preferred gain control states,
the subset of preferred phase shifting states,
the subset of preferred gain control states, and
the combination of the subset of preferred phase shifting states and the subset of preferred gain control states,
are usable for each antenna element of a plurality of antenna elements of an antenna array of the UE.

27. The non-transitory computer-readable medium of claim 25, wherein
the subset of non-preferred phase shifting states,
the subset of non-preferred gain control states,
the combination of the subset of non-preferred phase shifting states and the subset of non-preferred gain control states,
the subset of preferred phase shifting states,
the subset of preferred gain control states, and
the combination of the subset of preferred phase shifting states and the subset of preferred gain control states,
are identified per antenna element of a plurality of antenna elements of an antenna array of the UE.

28. The non-transitory computer-readable medium of claim 25, further including program code executable by the computer for causing the computer to identify a reduced antenna array size of a plurality of antenna elements of an antenna array of the UE, wherein the communication performance loss corresponds to the differential loss value between the communication performance of the reduced antenna array size and a third threshold performance value, wherein the program code executable by the computer for causing the computer to perform the communication with the serving network entity is using the reduced antenna array size.

29. The non-transitory computer-readable medium of claim 28, wherein the program code executable by the computer for causing the computer to identify is executed in response to execution of program code executable by the computer for causing the computer to one of:
- receive a performance message from the serving network entity; or
- determine a realizable array gain above a threshold minimum gain value, wherein the realizable array gain is associated with the reduced antenna array size and the reduced antenna array size is communicated by the UE to the serving network entity.

30. The non-transitory computer-readable medium of claim 26, further including program code executable by the computer for causing the computer:
- to generate a constrained hybrid beamforming codebook including a plurality of precoding matrices, wherein each element of a precoding matrix of the plurality of precoding matrices is determined from within the subset of preferred phase shifting states, or the subset of preferred gain control states, or the subset of non-preferred phase shifting states, or the subset of non-preferred gain control states,
- wherein the program code executable by the computer for causing the computer to communicate the indication of the communication performance loss is associated with the use of the subset of non-preferred phase shifting states, or the subset of non-preferred gain control states, or the combination of the subset of non-preferred phase shifting states and the subset of non-preferred gain control states, or the subset of preferred phase shifting states, or the subset of preferred gain control states, or the combination of the subset of preferred phase shifting states and the subset of preferred gain control states, relative to an estimated communication performance with a standardized hybrid beamforming codebook without the constrained RF architecture.

* * * * *